United States Patent
Abraham et al.

(10) Patent No.: US 9,451,417 B2
(45) Date of Patent: Sep. 20, 2016

(54) SYSTEM AND METHOD FOR MULTICAST COMMUNICATIONS IN WI-FI NETWORKS

(71) Applicant: QUALCOMM Incorporated, San Diego, CA (US)

(72) Inventors: Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 14/446,210

(22) Filed: Jul. 29, 2014

(65) Prior Publication Data

US 2015/0146607 A1 May 28, 2015

Related U.S. Application Data

(60) Provisional application No. 61/962,315, filed on Nov. 27, 2013.

(51) Int. Cl.
| | |
|---|---|
| *H04H 20/71* | (2008.01) |
| *H04W 4/06* | (2009.01) |
| *H04L 5/00* | (2006.01) |
| *H04L 1/16* | (2006.01) |
| *H04L 12/18* | (2006.01) |
| *H04L 1/00* | (2006.01) |

(52) U.S. Cl.
CPC .............. *H04W 4/06* (2013.01); *H04L 1/1685* (2013.01); *H04L 5/0055* (2013.01); *H04L 12/189* (2013.01); *H04L 2001/0093* (2013.01); *H04L 2001/0098* (2013.01)

(58) Field of Classification Search
None
See application file for complete search history.

(56) References Cited

U.S. PATENT DOCUMENTS

| | | |
|---|---|---|
| 8,116,249 B2 | 2/2012 | Shiba et al. |
| 2007/0189207 A1 | 8/2007 | Sammour et al. |
| 2008/0112350 A1 | 5/2008 | Nanda et al. |
| 2009/0276674 A1* | 11/2009 | Wei ........................... H04L 1/16 714/749 |
| 2010/0011273 A1 | 1/2010 | Parolari |
| 2011/0116435 A1 | 5/2011 | Liu et al. |
| 2012/0106427 A1 | 5/2012 | Nakae et al. |
| 2013/0301515 A1* | 11/2013 | Kim ...................... H04L 1/1864 370/312 |

OTHER PUBLICATIONS

International Search Report and Written Opinion—PCT/US2014/064024—ISA/EPO—Mar. 27, 2015.

* cited by examiner

*Primary Examiner* — Minh-Trang Nguyen
(74) *Attorney, Agent, or Firm* — Knobbe Martens Olson & Bear LLP

(57) ABSTRACT

A system and method for reliable multicast communications is disclosed herein. In one aspect, a first station may receive a first multicast frame having a first modulation and coding scheme and a first sequence number. The station may then receive a subsequent negative acknowledgement request having a second modulation and coding scheme and a indicating a second sequence number for previously transmitted multicast frame, with the second modulation and coding scheme having a lower data rate than the first modulation and coding scheme. The station may then selectively acknowledge the negative acknowledgement request based on a comparison of first sequence number and the second sequence number. In another aspect, the station transmits a negative acknowledgement if the second sequence number does not match the first sequence number and may further receive acknowledgement frame from an access point.

20 Claims, 21 Drawing Sheets

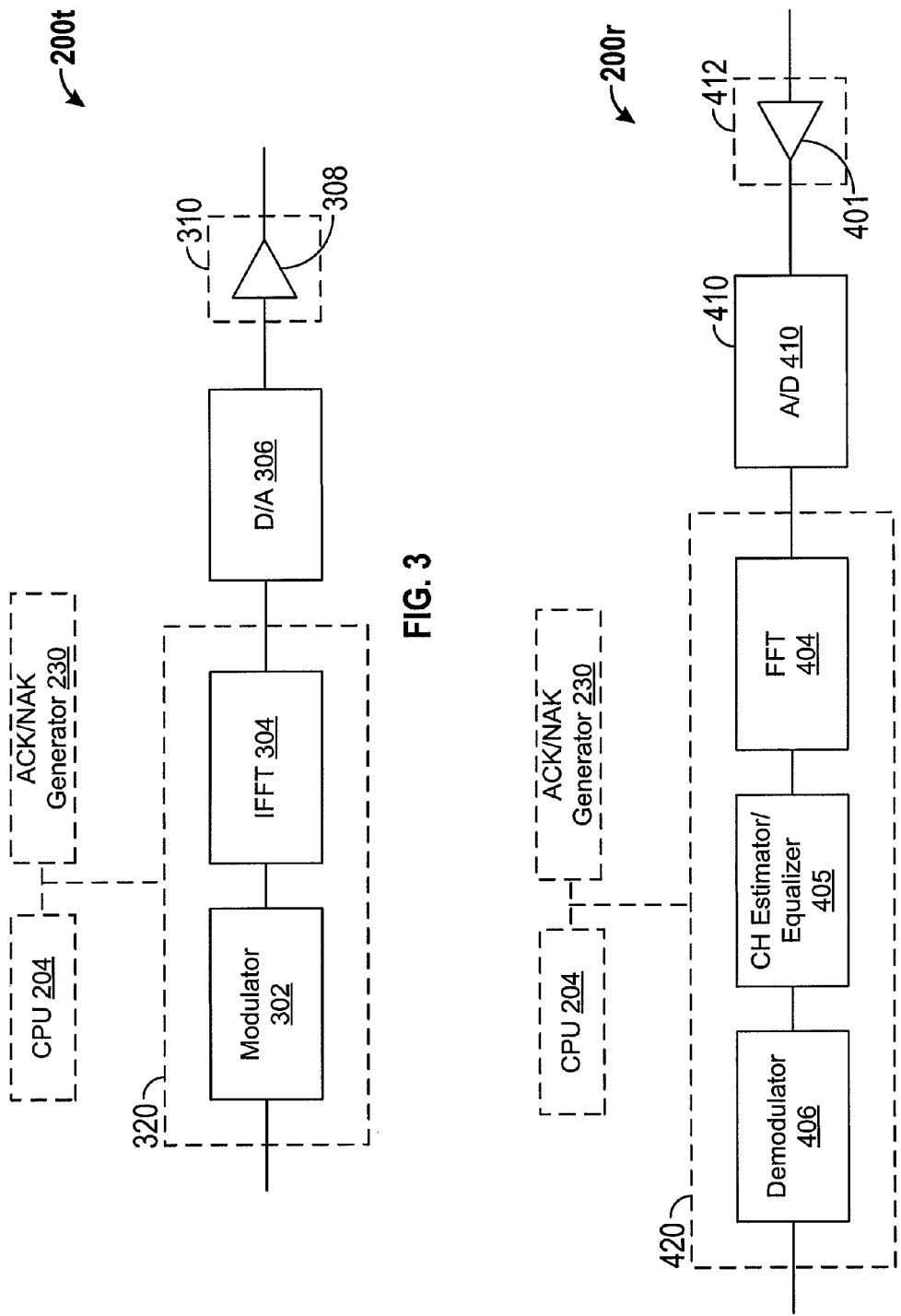

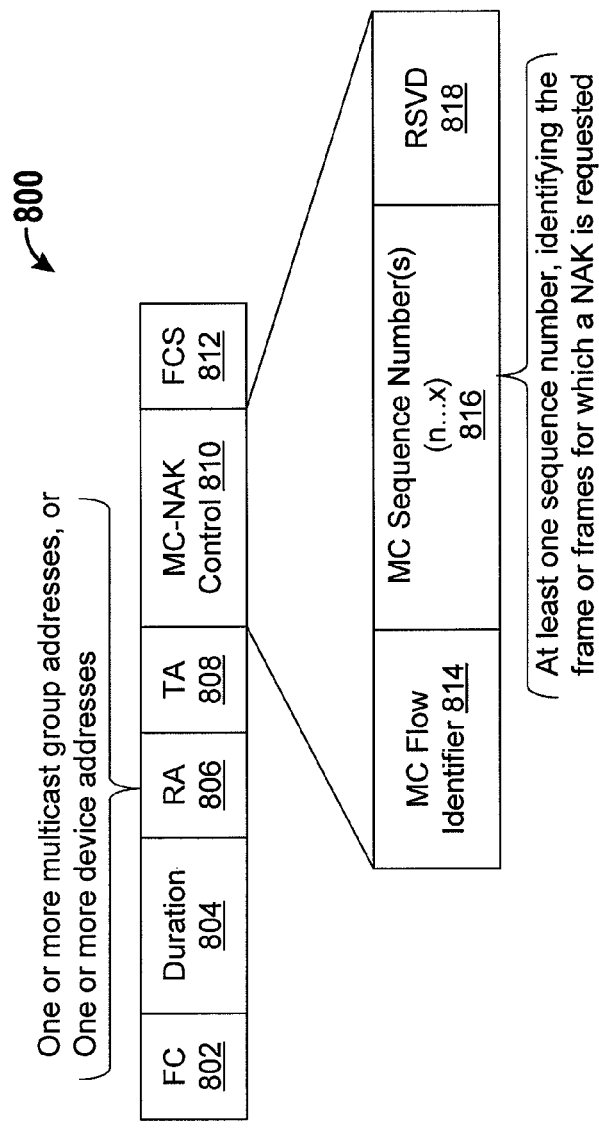

SYSTEM AND METHOD FOR MULTICAST COMMUNICATIONS IN WI-FI NETWORKS

CROSS REFERENCE TO RELATED APPLICATIONS

This application claims the benefit of U.S. Provisional Application No. 61/962,315, entitled "System and Method for Multicast Communications in Wi-Fi Networks," filed Nov. 27, 2013, the disclosure of which is hereby incorporated herein by reference in its entirety.

BACKGROUND

1. Field

The present application relates generally to wireless communications, and more specifically to systems, methods, and devices for enhancing communications reliability in multicast networks.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Multicast traffic is becoming more prominent, however multicast transmission in various protocols lacks substantial reliability. Current implementations of certain wireless protocols, such as the 802.11 standard do not include any form of receipt-acknowledgement. If data is lost or never arrives at its intended destination, there are few methods to timely notify the transmitter to remedy the lost data. Thus, improved systems, methods, and devices for improving multicast transmission reliability in wireless communication systems are desired.

SUMMARY

One aspect of the present disclosure provides a method for wireless communications comprising receiving a first multicast frame having a first modulation and coding scheme and a first sequence number at a first station. The method further comprises receiving a negative acknowledgement request, the negative acknowledgment request having a second modulation and coding scheme and a second sequence number, the second modulation and coding scheme having a lower data rate than the first modulation and coding scheme. The method further comprises refraining from transmitting a negative acknowledgement if the first sequence number is identical to the second sequence number Another aspect of the disclosure provides an apparatus for wireless communications comprising a first station configured to receive a first multicast frame having a first modulation and coding scheme and a first sequence number. The first station is further configured to receive a negative acknowledgement request, the negative acknowledgment request having a second modulation and coding scheme and a second sequence number, the second modulation and coding scheme having a lower data rate than the first modulation and coding scheme, and refrain from transmitting a negative acknowledgement if the first sequence number is identical to the second sequence number.

Another aspect of the disclosure provides an apparatus for wireless communications comprising means for receiving a first multicast frame having a first modulation and coding scheme and a first sequence number. The apparatus further comprises means for receiving a negative acknowledgement request, the negative acknowledgment request having a second modulation and coding scheme and a second sequence number, the second modulation and coding scheme having a lower data rate than the first modulation and coding scheme. The apparatus further comprises means for refraining from transmitting a negative acknowledgement if the first sequence number is identical to the second sequence number.

DESCRIPTION OF THE DRAWINGS

FIG. 3 shows a functional block diagram of components that may be utilized in the wireless device of FIG. 2 to transmit wireless communications.

FIG. 4 shows a functional block diagram of components that may be utilized in the wireless device of FIG. 2 to receive wireless communications.

FIG. 8a is a schematic representation of an embodiment of a multicast negative acknowledgement request frame, according to the present disclosure.

FIG. 8b illustrates an embodiment of a control frame extension table according to the present disclosure.

DETAILED DESCRIPTION

Figure 1:
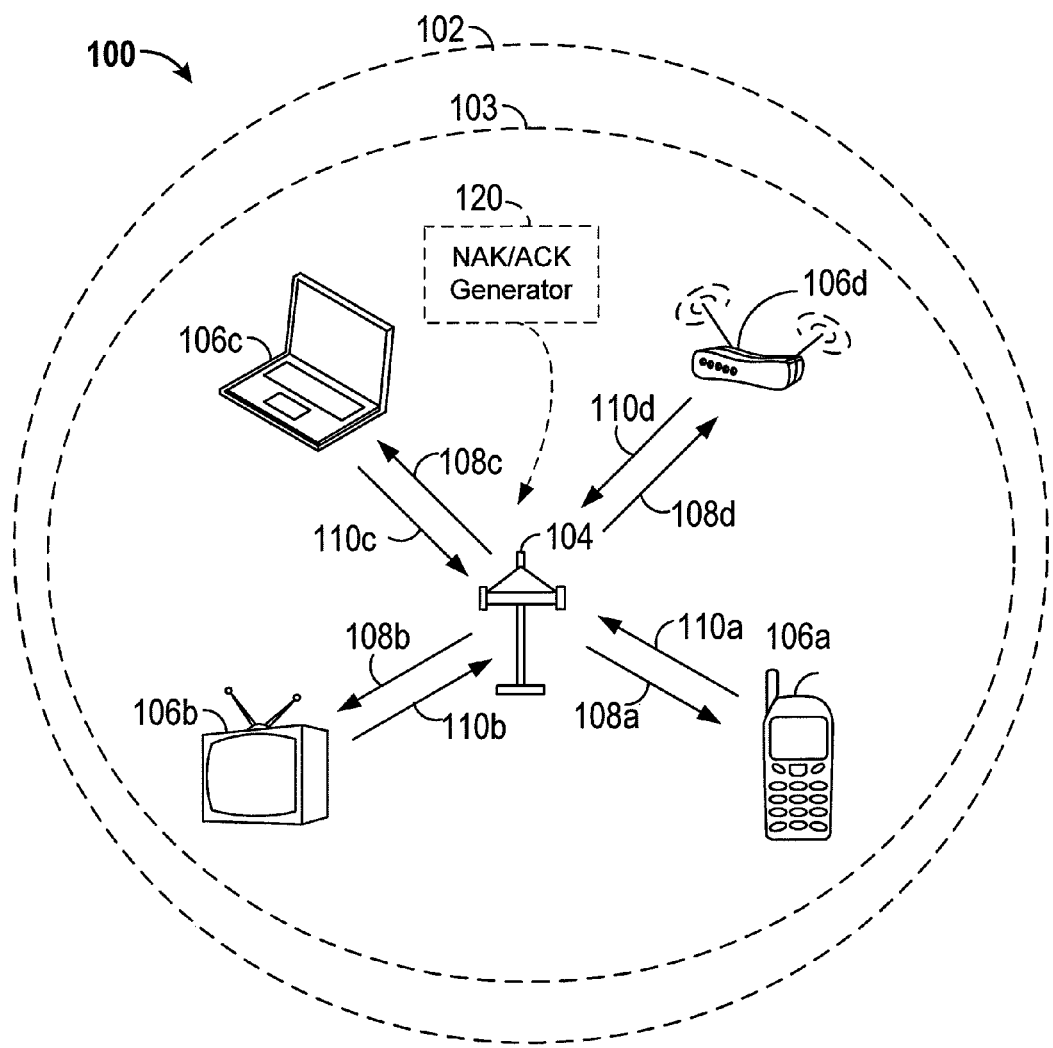
FIG. 1 illustrates an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim. In addition, the word "exemplary" is used herein to mean "serving as an example, instance, or illustration." Any embodiment described herein as "exemplary" is not necessarily to be construed as preferred or advantageous over other embodiments.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some aspects, certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a wireless communication device, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communication.

FIG. 1 illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106*a*, 106*b*, 106*c*, and 106*d* (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. BSA 102 may further coincide with a multicast (MC) group 103, containing the same group of wireless devices. Alternatively, a BSA 102 may include multiple MC groups 103. It is to be appreciated by those skilled in the art that the single MC group 103 in FIG. 1 should not be considered limiting with respect to the present disclosure. MC groups 103 may contain multiple different subsets of devices within a given BSA 102.

In an embodiment, the AP 104 along with the STAs 106 associated with the AP 104 and that use the AP 104 for communication may be referred to as a basic service set (BSS). Various BSSs may be further grouped or linked into an extended service set (ESS). An ESS may be created by linking a group of BSSs together with a backbone network so that coverage provided by each BSS overlaps with other BSSs. All of the APs in the ESS may be given the same service set identifier (SSID) or network name. It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In the embodiment of communications system 100 shown, an AP 104 may be required to communicate with multiple STAs 106*a*-106*d* simultaneously. In such an environment multicast communications may be employed utilizing a wireless protocol, e.g. the 802.11 standard. In the event an AP 104 must provide multiple STA's 106 with the same data traffic, a downlink 108 message may be transmitted to multiple STAs 106 within a multicast group 103. A downlink 108 message may further be transmitted to multiple MC groups 103 as required. Such a multicast group 103 may comprise all four STAs 106*a*-106*d*, or a subset of them. It should be appreciated by those skilled in the art that the four STAs 106 shown in FIG. 1 should not be considered limiting, as virtually any practical number of STAs can comprise a multicast group 103. In a multicast environment, downlink 108 may include the use of a downlink multicast frame, thus as discussed herein, downlink communications may also be referred to as a "downlink multicast frame" where applied to multicast communications. As shown, the BSS 102 is larger than While multicast communications may provide a more versatile and efficient method for disseminating traffic to multiple STAs 106, it is often difficult for an AP 104 to determine whether a successful transmission of a downlink multicast frame (not shown in this figure) has occurred, or whether there has been a successful receipt of the traffic by a given STA 106. If streaming data, such as audio or video, is transmitted via multicast communications, if an STA 106 does not receive a particular frame or frames, the entire transmission may be meaningless due to the missing data, creating efficiency and reliability problems for the downlink 108 traffic.

As disclosed herein, a number of systems and methods may be employed to provide increased reliability for a downlink 108 multicast frame to STAs 106. In embodiments disclosed herein, a negative acknowledgement (NAK) or acknowledgement (ACK) request process may be employed within communications sessions to verify receipt by a STA 106 of a given downlink multicast frame from the AP 104. An NAK/ACK generator 120 (shown in dashed lines) is provided within the communications system 100 to increase reliability by sending a separate request to the STAs 106, or by appending an additional ACK or NAK request to various downlink 108 or uplink 110 transmissions. The STAs 106 in receipt of the request, respond accordingly providing the AP 104 with an indication of whether or not the downlink 108 multicast frame was received by the STA 106, or not. In some embodiments, the AP 104 may further provide similar acknowledgements.

As discussed more fully below, an embodiment of the disclosure may incorporate a multicast NAK (MC-NAK) frame (shown below). In such an embodiment, an AP 104 may send an MC-NAK request, including the most recently transmitted multicast packet sequence number or numbers, or other identifying characteristics. The receiving STAs 106 that did not received the latest sequence number(s) identified in the MC-NAK request, may respond to the request allowing the AP 104 to take appropriate action and retransmit the identified frame or frames, or correct the modulation and coding scheme (MCS) for following transmissions. In an embodiment, the AP 104 may use or otherwise encode data with a MCS that provides a lower data rate, increasing the probability of receipt by the intended receiver.

In some embodiments, an ACK-based approach is taken, wherein the AP 104 may transmit a multicast frame including a network address of the STA 106 that is required to send an ACK frame in response to the receipt of the multicast frame. The designated STA 106 chosen for the response may be referred to herein as the "responding STA." Such a network address may include a media access control (MAC) address or other practical addressing techniques known in the art. In some embodiments, the STA 106 with the weakest signal strength is chosen as the responding STA. In other embodiments, the role of the responding STA may rotate throughout the multicast group.

Figure 2:
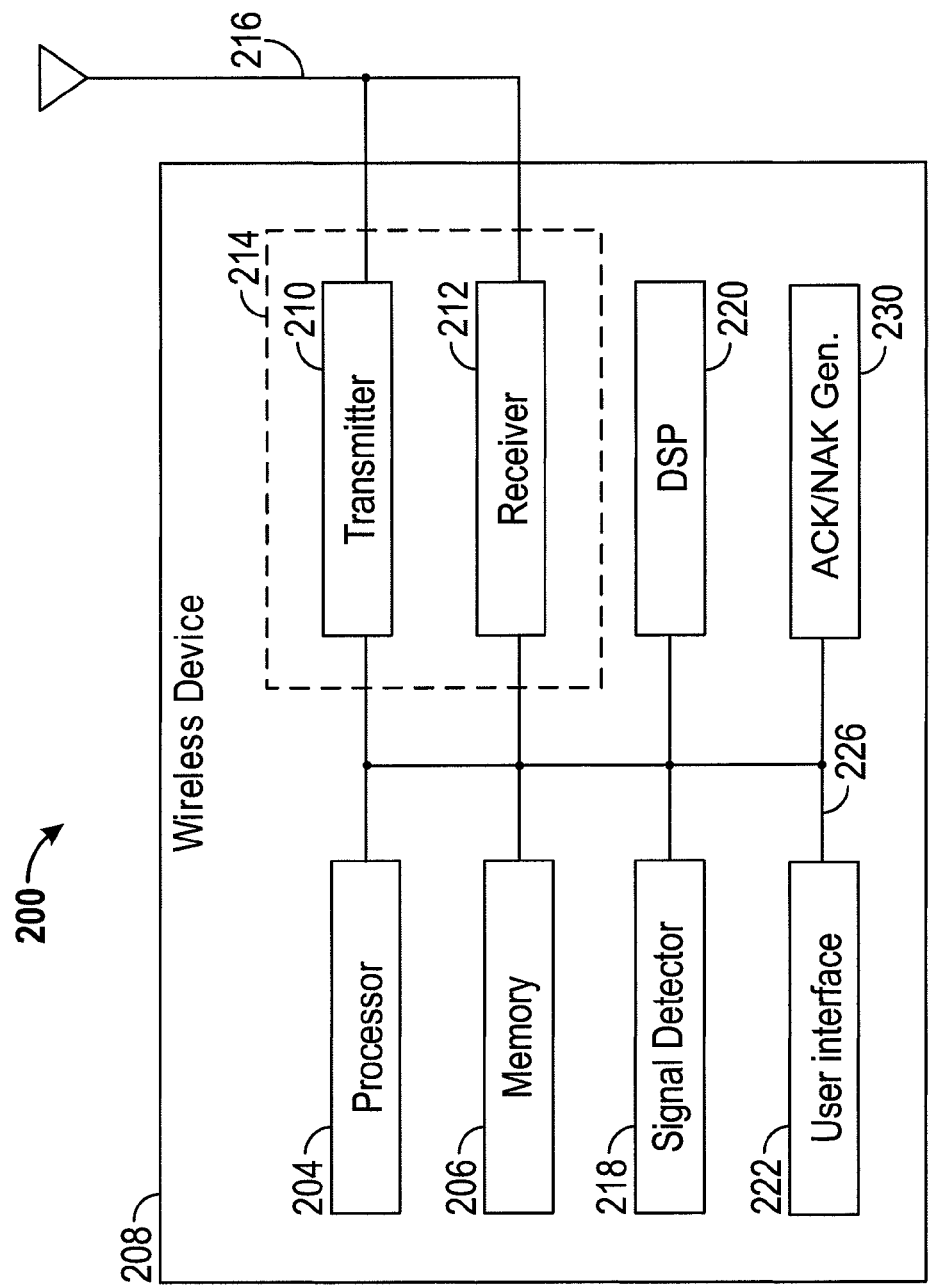
FIG. 2 shows a functional block diagram of an embodiment of a wireless device that may be employed within the wireless communication system of FIG. 1.

Referring now to FIG. 2, functional block diagram of an embodiment of a wireless device that may be employed as AP 104 or STA 106 is shown, and labeled diagram 200. FIG. 2 illustrates various components that may be utilized in a wireless device 200 that may be employed within the wireless communication system 100. The wireless device 200 is an example of a device that may be configured to implement the various methods described herein. For example, the wireless device 200 may comprise the AP 104 or one of the STAs 106 of FIG. 1.

The wireless device 200 may include a processor 204 which controls operation of the wireless device 200. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 200 is implemented or used as a transmitting node, the processor 204 may be configured to select one of a plurality of medium access control (MAC) header types, and to generate a packet having that MAC header type. For example, the processor 204 may be configured to generate a packet comprising a MAC header and a payload and to determine what type of MAC header to use, as discussed in further detail below.

When the wireless device 200 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 200 may also include a housing 208 that may include a transmitter 210 and a receiver 212 to allow transmission and reception of data between the wireless device 200 and a remote location. The transmitter 210 and receiver 212 may be combined into a transceiver 214. An antenna 216 may be attached to the housing 208 and electrically coupled to the transceiver 214. The wireless device 200 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header types. In some aspects, the receiver 212 is configured to detect a type of a MAC header used and process the packet accordingly, as discussed in further detail below.

The wireless device 200 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 200 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 200 may further comprise a user interface 222 in some aspects. The user interface 222 may comprise a keypad, a microphone, a speaker, and/or a display. The user interface 222 may include any element or component that conveys information to a user of the wireless device 200 and/or receives input from the user.

Some embodiments of the wireless device 200 may further comprise an acknowledgement/negative acknowledgement (ACK/NAK) generator 230. As discussed herein, the ACK/NAK request may be included in a request from the transmitting device 200 to a receiving device to ensure a particular frame has been or has not been received. ACK/NAK generator 230 is not necessarily a separate component and in some embodiments may be combined with other components of the device 200, such as the processor 204.

The various components of the wireless device 200 may be coupled together by a bus system 226. The bus system 226 may include a data bus, for example, as well as a power bus, a control signal bus, and a status signal bus in addition to the data bus. Those of skill in the art will appreciate the components of the wireless device 200 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, and/or the ACK/.NAK generator 230. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 200 is configured as a transmitting node, it is hereinafter referred to as a wireless device 200t. Similarly, when the wireless device 200 is configured as a receiving node, it is hereinafter referred to as a wireless device 200r. A device in the wireless communication system 100 may implement only functionality of a transmitting node, only functionality of a receiving node, or functionality of both a transmitting node and a receive node.

As discussed above, the wireless device 200 may comprise an AP 104 or a STA 106, and may be used to transmit and/or receive communications having a plurality of MAC header types.

Referring now to FIG. 3, various components that may be utilized in the wireless device 200t to transmit wireless communications are shown and designated wireless device 200t. In some embodiments, the wireless device 200 may comprise an AP 104 or a STA 106, and may be used to transmit and/or receive communications. The components illustrated in FIG. 3 may be used, for example, to transmit OFDM communications. In some aspects, the components illustrated in FIG. 3 are used to generate and transmit packets to be sent over a bandwidth of less than or equal to 1 MHz.

The wireless device 200t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 200t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

Device 200t may further be fitted with an ACK/NAK generator 230, also shown in FIG. 2. ACK/NAK generator may provide input to, or generate appropriate headers or data for the processor 204 and/or to the DSP 320 in order to respond to an appropriate ACK/NAK request from another wireless device 200. As noted above, the arrangement of inputs from the processor 204 and the ACK/NAK generator 230 to the DSP 320 is for illustrative purposes, and should not be considered limiting. These functions may be combined or arranged in various manners to achieve the required functionality.

The modulator 302 and the transform module 304 are illustrated as being implemented in the DSP 320. In some aspects, however, one or both of the modulator 302 and the transform module 304 are implemented in the processor 204 or in another element of the wireless device 200t (e.g., see description above with reference to FIG. 2).

The DSP 320 may be configured to generate a data unit for transmission. In some aspects, the modulator 302 and the transform module 304 may be configured to generate a data unit comprising a plurality of fields including control information and a plurality of data symbols.

The wireless device 200t may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 200 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Referring now to FIG. 4, various components allowing wireless device 200 of FIG. 2 to receive wireless communications are shown and designated device 200r. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 200r is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 200r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 200r. In some aspects, the analog to digital converter 410 is implemented in the transceiver 214 (FIG. 2) or in a data receive processor.

The wireless device 200r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 200r may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 200t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

The transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 200 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406. In some embodiments, received data may include ACK/NAK requests from another wireless device 200t, for which the ACK/NAK generator 230, in conjunction with the DSP 420 and/or the processor 204 may have to respond accordingly. Further, in the event the wireless device 200r is receiving data for which an ACK/NAK response frame is required, the ACK/NAK generator 230 and/or processor 204 and DSP 420 may provide input for generating an appropriate response.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Medium Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 200t shows an example of a single transmit chain to be transmitted over an antenna. The wireless device 200r shows an example of a single receive chain to be received over an antenna. In some implementations, the wireless device 200t or 202b may implement a portion of a MIMO system using multiple antennas to simultaneously transmit data.

As discussed above, the medium occupancy of a wireless channel may become congested when a large number of wireless devices within the network attempt to send and/or receive communications. Wireless devices within the network send frames for managing communications within the network (e.g., control and management frames, such as acknowledgement (ACK) frames, negative acknowledgement (NAK) frames, beacons, power save poll frames, clear to send frames, request to send frames, etc.). Medium occupancy may be higher after certain frames are transmitted from an AP to a STA (or from one STA to another STA in a peer-to-peer type network). For example, the medium occupancy of a channel after the transmission of a beacon signal may be higher than the medium occupancy prior to transmission of the beacon signal. An AP 104 may transmit a beacon signal (or simply a "beacon"), via a communication link such as the downlink 108, to other STAs 106 of the system 100, which may help the other STAs 106 to synchronize their timing with the AP 104, or which may provide other information or functionality. Such beacons may be transmitted periodically so that the STAs 106 within the network will know when a subsequent beacon will be received.

Figure 5A:
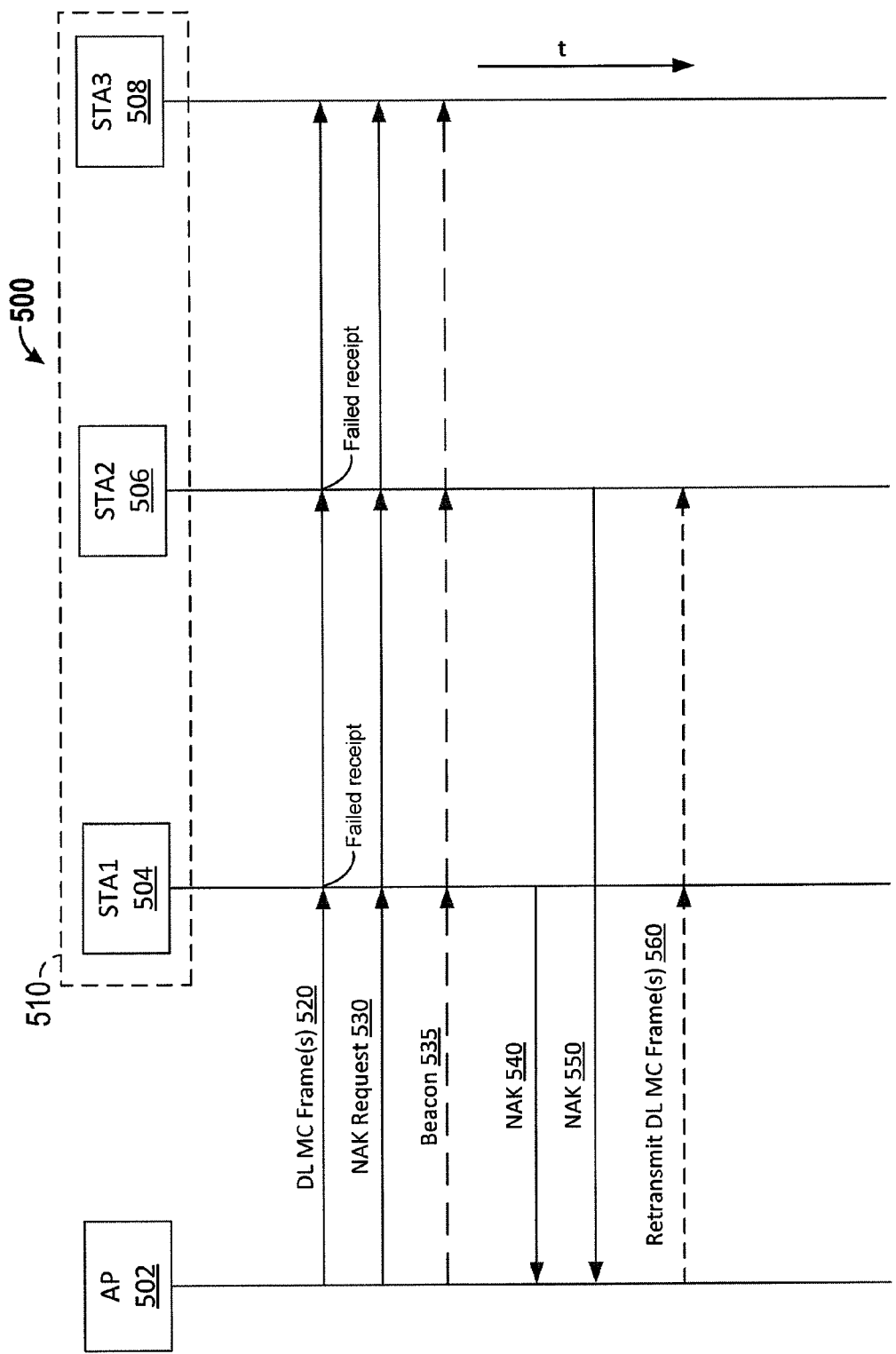
FIG. 5a illustrates an embodiment of a signal flow diagram using negative acknowledgements according to the present disclosure.

Referring now to FIG. 5a a signal flow diagram 500, of a transmitter/receiver combination in a multicast (MC) communications environment incorporating multicast negative acknowledgment (MC-NAK) request, is shown. In the embodiment shown, AP 502 is transmitting data and receiving responses from three exemplary STAs 504, 506, 508 that may comprise multicast (MC) group 510. It is to be appreciated by those skilled in the art that the number or composition of the multicast group(s) 510 is not to be considered limiting. In diagram 500, time (t) flows from top to bottom, with each vertical line indicating a terminus for data transmissions to and from each wireless device shown. Individual arrowheads indicate an intended receiver of each transmission. The various embodiments discussed with respect to FIG. 5a, including AP 502, and STAs 504, 506, 508 may correspond to and be implemented in a similar manner as the analogous elements, structures, and processes described in FIG. 1.

Figure 5B:
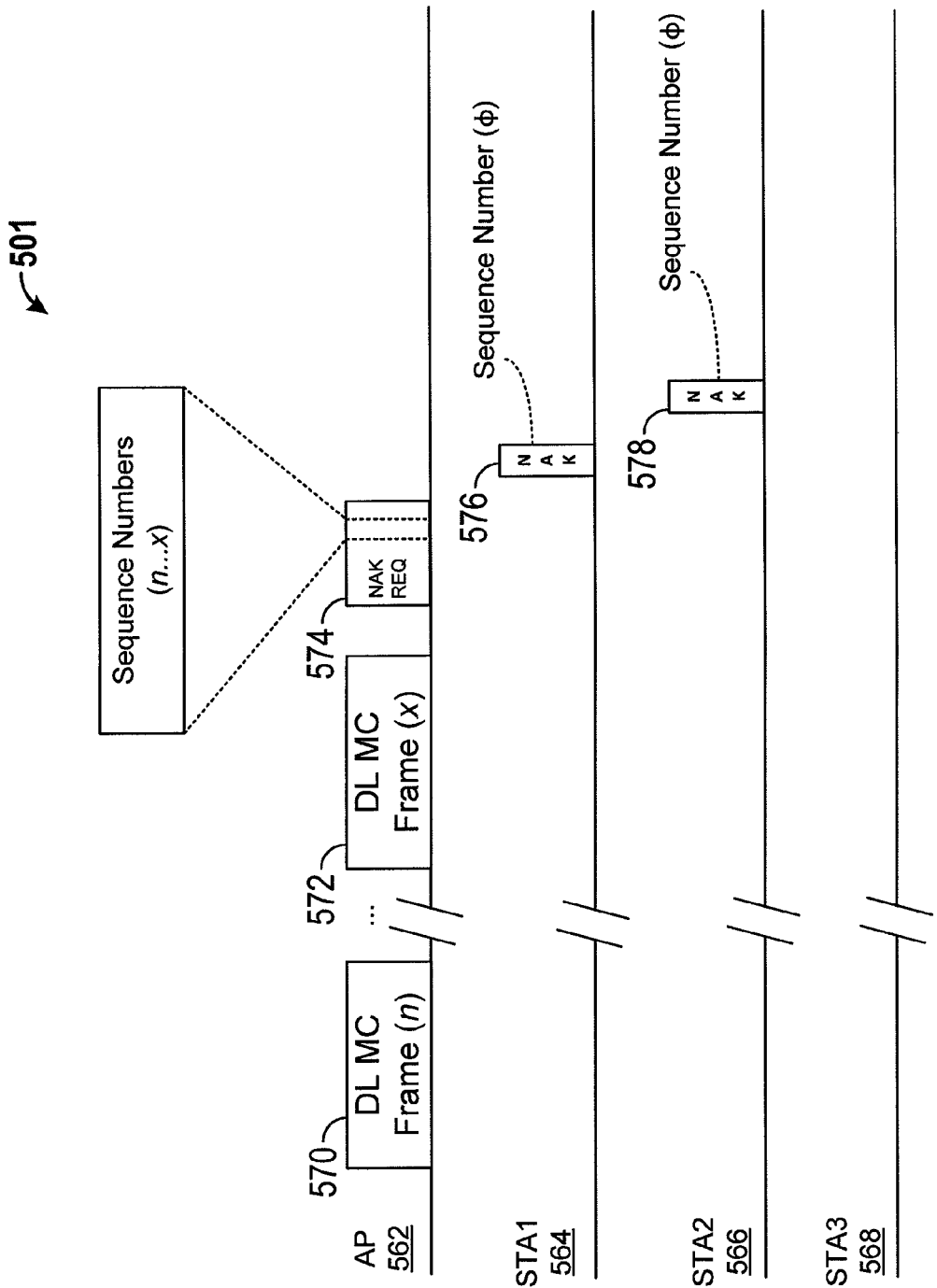
FIG. 5b illustrates an alternative view of the signal flow diagram of FIG. 5a using negative acknowledgements according to the present disclosure.

As shown, AP 502 may transmit one or more downlink multicast (DL MC) frames 520 to the entire multicast group 510, as shown by the arrowheads terminating at each STA 504, 506, 508. While only a single DL MC frame 520 is indicated in FIG. 5, it is to be appreciated by those skilled in the art that multiple DL MC frames 520 may be transmitted in succession without departing from the intent of the disclosure, as discussed more fully with respect to FIG. 5b. A single DL MC frame 520 is shown in FIG. 5a for simplicity.

Following the DL MC frame 520, the AP 502 may send a negative acknowledgement (NAK) request 530 to each of the STAs 504, 504, 508 in the MC group 510. The NAK request 530 may be sent as a separate frame and may both identify the most recently transmitted DL MC frame (or frames) 520 by a sequence number(s) contained within the MC frame 520, or other appropriate identification scheme, while at the same time addressing the NAK request 530 to the specific members of the MC group 510. In an embodiment, multiple DL MC frames 520 may be sent, each having a sequence number that may be reflected by one or more sequence numbers identified in the NAK request 530. The NAK request 530 may be encoded and sent using a robust MCS such that there it a high probability that the NAK request 530 will be received by the entire MC group 510. In an embodiment, this may ensure that the NAK request 530 may reach the intended recipient even if the associated DL MC frame 520 does not. The MCS utilized for the NAK request 530 may or may not be the same as that used for the transmission the DL MC frame 520.

In some embodiments, an NAK request 530 may alternatively be included within a beacon 535, shown in dashed lines, the dashed lines indicating beacon 535 may be implemented in place of the individual NAK request(s) 530. However, because using a beacon for such signaling increases the time between NAK request and a corresponding response from the receiver, such a scheme may more appropriate in circumstances where latency requirements are less stringent.

Following receipt of the NAK request 530 by each of the STAs in the MC group 510, a NAK may be sent by those STAs that did not receive the MC DL frame 520 identified by the NAK request 530. Conversely, those STAs that did receive the DL MC frame(s) identified within the NAK request 530 may refrain from sending a response, reducing overall data traffic. As shown in FIG. 5a, for example, STA 504 and STA 506 did not receive the DL MC frame 520 (noted by the "failed receipt" indication), thus STA 504 responds with NAK 540, and STA 506 responds with NAK 550. Both NAKs 540, 550 may identify the missing DL MC frame 520 by indicating the associated sequence number(s) or at least an identification of the corresponding NAK request 530. Likewise, STA 508 did receive the DL MC frame 520, thus no NAK is sent.

Following receipt of individual NAKs 540, 550, the AP 502 may determine remedial actions in response. AP 502 may determine whether to send retransmission 560 of the DL MC frame. Accordingly, the AP 502 may retransmit the DL MC frame 560 (shown in dashed lines) to the STAs 504, 506 that sent NAKs 540, 550. In some embodiments, the loss of a single frame may be trivial and retransmission of the DL MC frame 560 may not be required. In such a case, the AP 502 may instead adjust the MCS as needed for following transmissions.

Referring now to FIG. 5b, an alternative view of the signal flow diagram 500 is shown and designated signal flow 501. The various embodiments discussed with respect to FIG. 5b, including AP 562, and STAs 564, 566, 568 may correspond to and be implemented in a similar manner as the analogous elements, structures, and processes described in FIG. 1.

Time (t) moves from left to right, with individual communications shown being transmitted from the AP 562, STA 564, 566, 568 indicated as blocks on the corresponding lines. Further included in signal flow 501 is the transmission of multiple DL MC frames, shown as DL MC frame 570 having sequence number "n" and DL MC frame 572 having sequence number "x." Breaks and an ellipsis (" . . . ") are shown in the timeline and are intended to indicate the possible transmission of a plurality of DL MC frames beyond those shown.

Similar to above, the AP 562 may then follow the transmission of a plurality of DL MC frames (e.g., DL MC frames 570, 572) with a NAK request 574 identifying the previously transmitted frame, or frames. As such, the NAK request 574 may include an identification of DL MC frames with sequence numbers n . . . x, as shown. A above, as NAK request 574 may follow the DL MC frames n . . . x, 570, 572, indicating the sequence numbers of the frames for which the NAK 574 is requested. In the event a particular frame or data portion is not properly received, one or more NAK's 576, 578 may be transmitted from those stations 564, 566 that did not properly receive at least one of the DL MC frames identified in the NAK request 574. As shown, the NAK 576 and NAK 578 identify a sequence number (shown as a variable "φ"), corresponding to one of the plurality of sequence numbers n-x, indicating non-receipt of the indicated data. STA 568 does not transmit a NAK in this example indicating proper receipt of the frames identified in the NAK request 574.

Figure 6A:
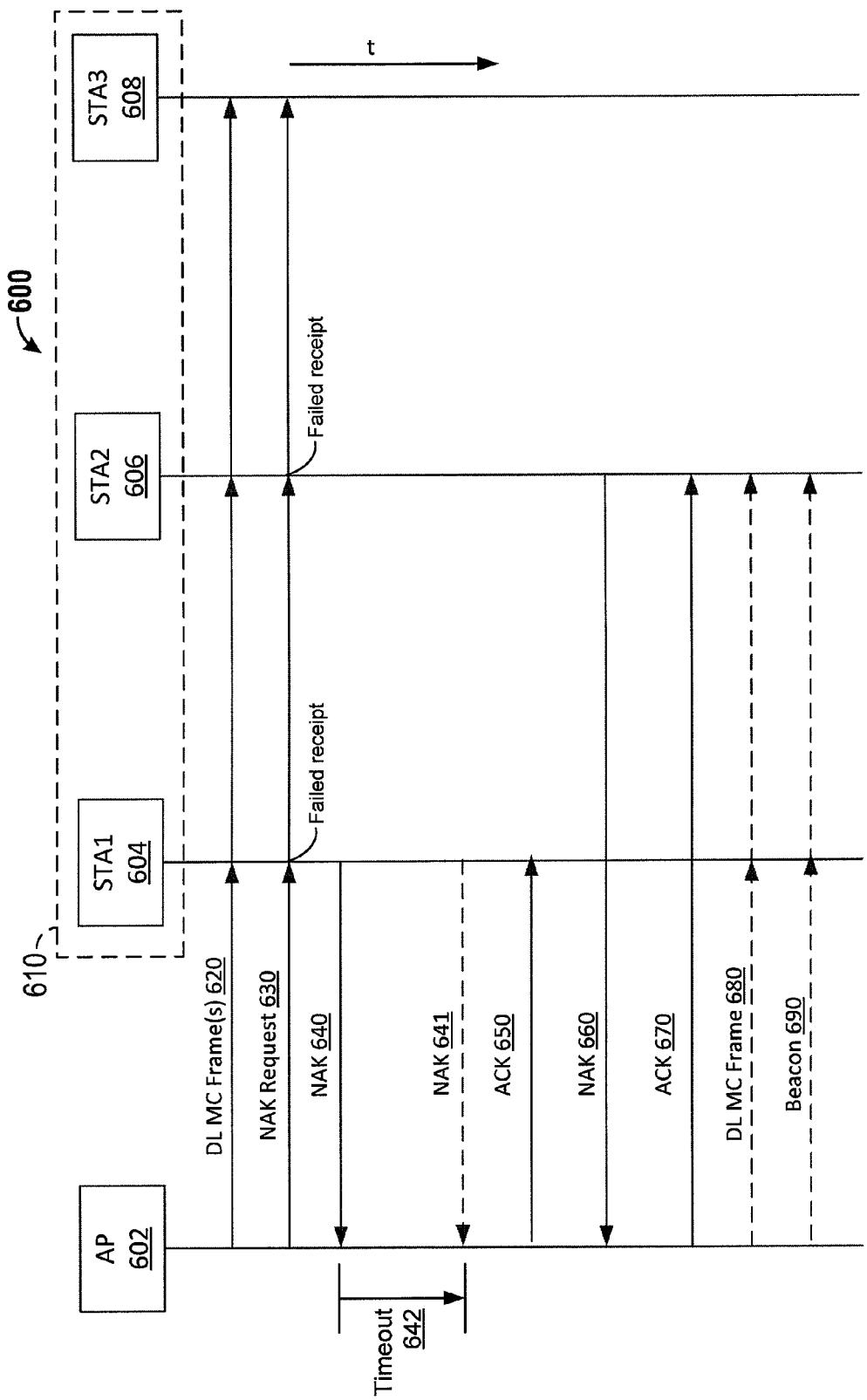
FIG. 6a illustrates an embodiment of a signal flow diagram providing an acknowledgement for each negative acknowledgement received according to the present disclosure.

Referring now to FIG. 6a, an embodiment of a signal flow diagram, designated signal flow 600, of a transmitter/receiver combination in a multicast (MC) communications environment incorporating multicast negative acknowledgment (MC-NAK) request with an acknowledgement (ACK), is shown. In the embodiment shown, AP 602 is transmitting data and receiving responses from three exemplary STAs 604, 606, 608 that may comprise a multicast group 610. It is to be appreciated by those skilled in the art that the number or composition of the multicast group 610 is not to be considered limiting. In signal flow 600, time (t) flows from top to bottom, with each vertical line indicating a terminus for data transmissions to and from each wireless device shown. Individual arrowheads indicate an intended receiver of each transmission. The various embodiments discussed with respect to FIG. 6a, including AP 602, and STAs 604, 606, 608 may correspond to and be implemented in a similar manner as the analogous elements and structures described in FIG. 1.

In an embodiment of signal flow 600, the AP 602 may transmit a DL MC Frame 620 to MC group 610, comprising STAs 604, 606, 608. AP 602 may then follow the DL MC frame 620 with a NAK request 630, as before in FIGS. 5a and 5b. In an embodiment, the NAK request 630 again may be encoded and transmitted with a robust MCS, increasing the probability of receipt by all the members of the MC group 610. The NAK request may have an address to the MC group 610 or individual addresses for each of the members, STAs 604, 606, 608, such that each STA responds as required. A transmission to more than one MC group 610 is also possible, however only one is shown here for simplicity.

In an embodiment, following an individual NAK 640 from STA 604, for example, AP 602 may further respond with an ACK frame 650, indicating the receipt of the STA's 604 NAK 640. This provides an additional layer of reliability for the transmission of the data. In the event an AP 604 does not receive the ACK 650 from AP 602 following the transmission of NAK 640 within an expected time frame, then a subsequent NAK 641 may be transmitted. Subsequent NAK 641 is shown in dashed lines indicating that it is optionally sent when NAK 640 transmission fails. STA 604 may implement a timeout or backoff time 642 between transmission of NAK 640 and the retransmission of NAK 641, in order to account for sufficient time between transmission and receipt of an ACK (e.g. ACK 650) from AP 601. In an embodiment, retransmission timeframes (backoff 642) for subsequent NAKs, such as NAK 641, may be indicated by information elements within frames previously transmitted to the MC group 610, such as an information element within the DL MC frame 620, in the NAK request 630, or in a beacon 690. In an embodiment, beacon 690 may also indicate to the members of MC group 610 dedicated NAK response times or windows.

FIG. 6a further shows NAK 660 transmitted from STA 606, indicating non-receipt of the DL MC frame 620. Accordingly, ACK 670 is then transmitted, addressed to STA 606 indicating receipt of the NAK 660. No NAK frame is received from STA 608 thus AP 602 may presume proper receipt of the DL MC frame 620.

In an embodiment, AP 602 may wait a predetermined amount of time prior to taking remedial action in response to NAK frames 640, 660 received from the STAs 604, 606. The AP 602 may then transmit DL MC frame 680 (shown in a dashed line). In an embodiment, DL MC frame 680 may be a retransmission of DL MC frame 620 to the entire MC group 610, or a subset of the MC group 610, such as a frame addressed only to those STAs 604, 606 that did not receive the previous transmission. In another embodiment, the AP 602 may determine retransmission of DL MC frame 620 is not required and omit a retransmission, instead adjusting the MCS for a new or different DL MC frame 680.

Figure 6B:
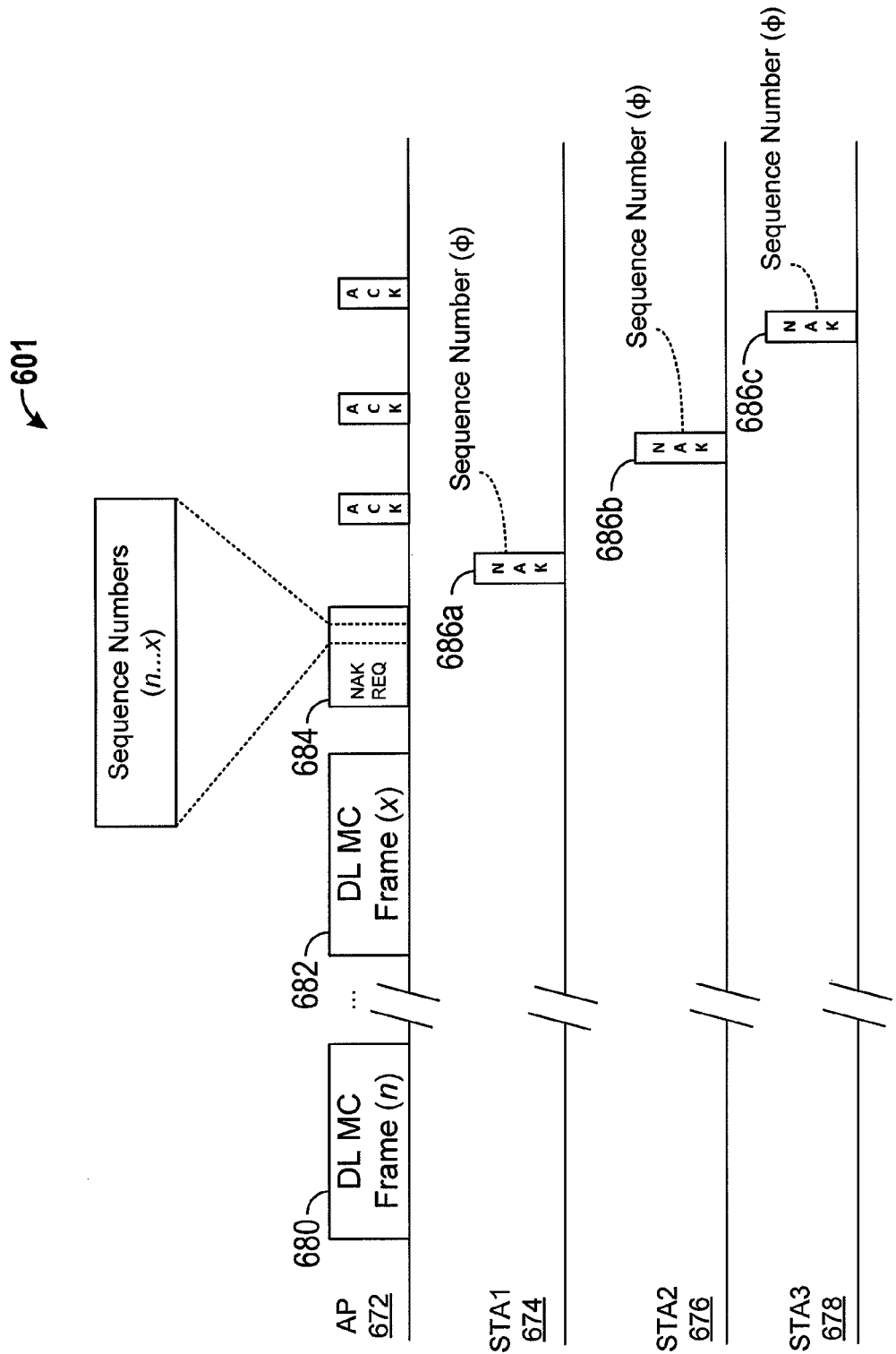
FIG. 6b illustrates an alternative view of the signal flow diagram of FIG. 6a providing an acknowledgement for each negative acknowledgement received according to the present disclosure.

Referring now to FIG. 6b, an alternative view of the signal flow diagram 600 is shown and is designated signal flow 601. The various embodiments discussed with respect to FIG. 6b may correspond to and be implemented in a similar manner as the analogous elements, structures, and processes described in FIG. 1.

Similar to signal flow 501, the AP 672 transmits multiple DL MC frames. As shown, DL MC frame 680 has sequence number "n" and DL MC frame 682 has a sequence number "x." Following the transmission of the desired plurality of DL MC frames, a NAK request 684 identifying the previously transmitted frames n-x. In an embodiment, where certain of the frames having sequence numbers indicated in the NAK request 684 the STAs may respond with an appropriate NAK indicating non-receipt of the sequence numbers indicated in the NAK. As a non-limiting example, STA 674 transmits NAK 686a indicating the sequence number(s) within the series n . . . x (indicated by the variable φ) indicated in the NAK request 684, but not received by the STA 674. Similarly, STA 676 and STA 678 may send NAKs 686b-c indicating non-receipt of one or more of the identified sequence number or numbers in the NAK request 684. Similar to signal flow 600, the AP 672 may send an ACK 688a-c for each of the NAKs 686a-c received.

Figure 7A:
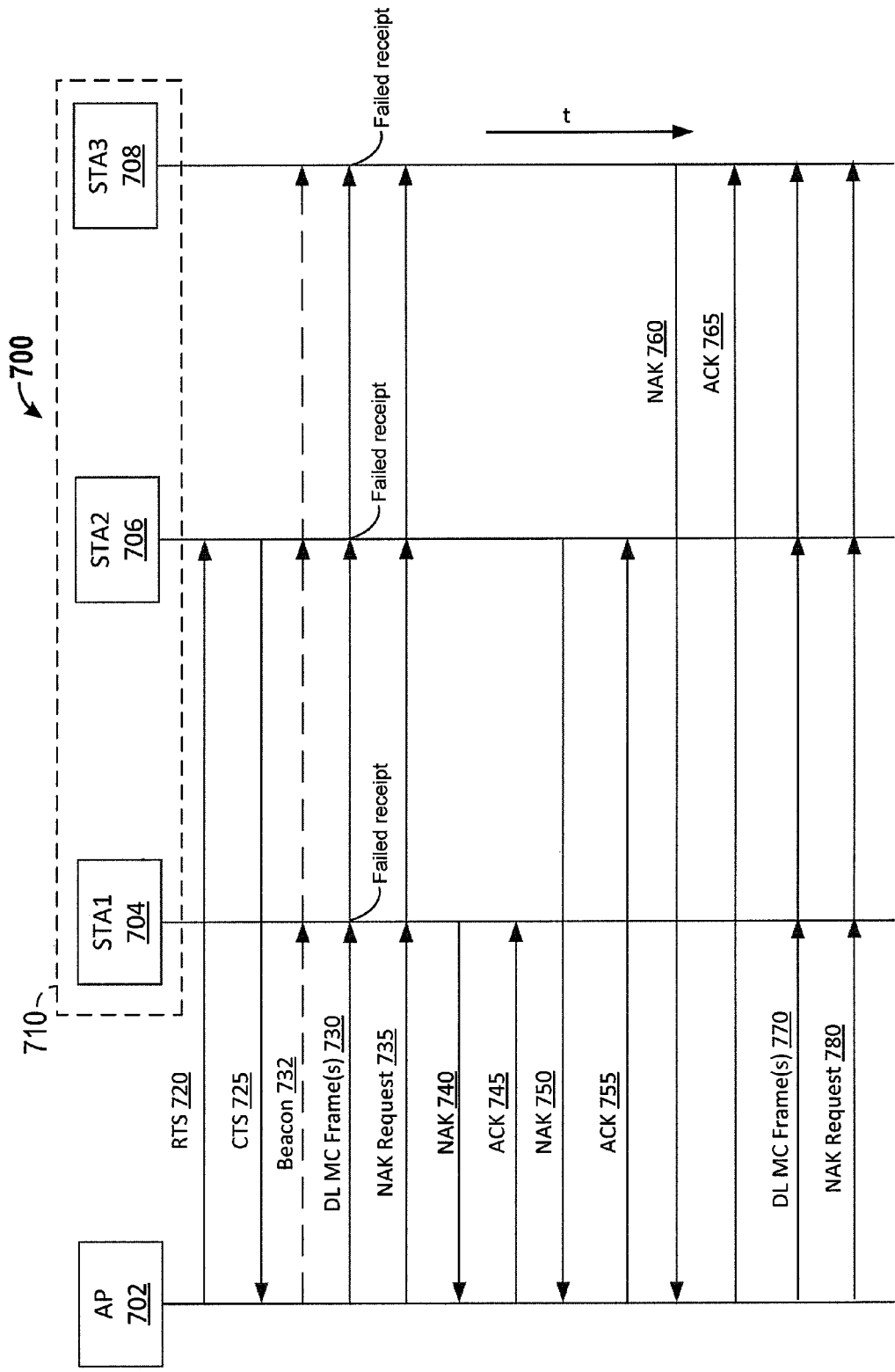
FIG. 7a illustrates an embodiment of a signal flow diagram according to the present disclosure providing partial hidden node protection.

Referring now to FIG. 7a an embodiment of a signal flow diagram, designated signal flow 700, of a transmitter/receiver combination in a multicast (MC) communications environment incorporating multicast negative acknowledgment (MC-NAK) request, is shown. The various embodiments discussed with respect to FIG. 7a may correspond to and be implemented in a similar manner as the analogous elements, structures, and processes described in FIG. 1.

In the embodiment shown, AP 702 is transmitting data and receiving responses from three exemplary STAs 704, 706, 708 that comprise multicast group 710. It is to be appreciated by those skilled in the art, as above, that the number or composition of the multicast group 710 is not to be considered limiting. In signal flow 700, time (t) flows from top to bottom, with each vertical line indicating a terminus for data transmissions to and from each wireless device shown. Individual arrowheads indicate an intended receiver of each transmission.

Signal flow 700 incorporates an additional layer of reliability in transmission providing a request to send (RTS)/clear to send (CTS) messages. In an embodiment employing the RTS/CTS protocol, the AP 702 transmitting to multiple members of an MC group 710 may at least partially protect against data loss due to the "hidden node problem" by verifying the medium is clear prior to transmitting data. The hidden node problem refers to certain nodes or devices that are out of range of other nodes or a collection (MC group) of nodes. This is discussed further with respect to FIG. 7c.

An RTS 720 may be sent to the MC group 710, addressing the RTS 720 to a particular or individual AP 706. If the medium is clear, STA 706 may respond with a CTS 725, indicating STA 706 is ready to receive the traffic. In an embodiment, the RTS 720 may be addressed to the entire MC group 710 to poll all intended recipients, or the RTS 720 may be addressed to only one STA 706 (as shown) or a subset of STAs (not shown) within the MC group 710. In an embodiment, the AP 702 may further determine to which STAs the RTS 720 messages are sent randomly, based on a predetermined list of required STAs, or further based on link and/or network parameters and conditions, such as, for example, quality of service, signal to noise ratio, etc. In an embodiment, the STA within MC group 710 chosen to receive the RTS may be the STA having the lowest received signal strength indication (RSSI), discussed below. The CTS 725 may alternatively be addressed to the AP 702 itself (shown in FIG. 7b), informing the rest of the MC group 710 to reserve the medium for the AP 702. In another embodiment, where a multicast frame 730 transmitted immediately after a beacon 732, the AP 702 may include in the multicast transmission time in the Beacon NAV frame of beacon 732, informing the MC group 710 as to when a given DL MC frame (DL MC 730, as shown) is to be transmitted. Beacon 732 is shown in dashed lines indicating that it may not be required for all implementations of the methods described herein.

Once an appropriate CTS 725 has been received at the AP 702, AP 702 may transmit a downlink multicast (DL MC) frame 730 to the entire multicast group 710, as shown by the arrowheads terminating at each STA 704, 706, 708. Following the DL MC frame 730, the AP 702 may, as before, transmit a negative acknowledgement (NAK) request 735 to each of the STAs 704, 706, 708 in the MC group 710. The NAK request 735 may be sent as a separate frame and may both identify the most recently transmitted DL MC frame 730 by a sequence number contained within the MC frame 730 (or other appropriate identification scheme) while at the same time addressing the NAK request 735 to one or more MC groups 710 or a subset of the members of MC group 710. In an embodiment, multiple DL MC frames 730 may be sent, each having a sequence number that may be reflected by one or more sequence numbers identified in the NAK request 735. The NAK request 735 may be sent with a robust MCS such that there it a high probability that the NAK request 735 will be received by the entire MC group 710. The MCS utilized for the NAK request 735 may also be the same as that used for the transmission the DL MC frame 520. In some embodiments, an MC NAK request 735 may further be implemented within a beacon 732 as before.

Where a member of the MC group 710 does not receive (indicated by "failed receipt") the DL MC frame 730, a NAK should be transmitted. As shown, NAK 740 is transmitted from STA 704 indicating non-receipt of the DL MC frame 730. In an embodiment, the STA 702 may further respond to the NAK 740 with an ACK 745, indicating the AP 702 received the NAK 740. A similar exchange is also shown with respect to NAK 750 from STA 706 with AP 702 indicating receipt via ACK 755, and NAK 760 from AP 708 with AP 702 indicating receipt via ACK 765.

In signal flow 700, none of the three members of the MC group 710 received the MC DL frame 730, requiring AP 702 to determine whether to retransmit the DL MC frame 730 or adjust the MCS for the following transmission. As such, the DL MC frame 770 may be a retransmission of the previous DL MC frame 730 or different data. As before, a NAK request 780 is also transmitted, requested a negative acknowledgement from the STAs 702, 704, 706 that do not receive the associated DL MC frame 780.

For the previous embodiments discussed with respect to FIGS. 5, 6, and 7, and more particularly signal flows that may introduce a MC NAK methods for increased reliability in transmissions, an AP 502, 602, 702 may maintain a record of the optimum DL MCS for each STA associated with the MC groups 510, 610, 710, and subsequently pick the most robust MCS from among the STAs that belong to a given MC group. This may result in more reliable and more efficient communications in a multicast environment.

Further, some embodiments of the examples discussed with respect to FIGS. 5, 6, and 7 may include additional error recovery procedures when an AP 502, 602, 702 receives a given MC NAK as discussed above. The AP 502, 602, 702 may adjust the rate or MCS of the next multicast transmission, or retransmit the previous packets/frames using a unicast or multicast frame addressed to the particular STAs from which the NAKs were received. For example, unicast transmissions may be selected where only one or a few NAKs were received at the AP from STAs with a high MCS. Alternatively, an AP 502, 602, 702 may determine to transmit or retransmit packets or frames based on a target transmission-success percentile. For example, where such a percentile is chosen at a value of 90 percent, in the case of an MC group having 10 STAs, if only one STA does not receive a given DL MC frame (as shown above) and responds with an MC NAK, the AP will not retransmit the previous frame. However, should more than one STA respond with an MC NAK under such circumstances, the transmission success falls below the 90 percent threshold (two NAKs out of 10 STAs, or 80 percent), and the AP may determine retransmission is required. In another embodiment, an AP may indicate a duration that a given DL MC frame may be buffered or retransmitted to a given MC group. If a given STA does not receive a DL MC frame as described outside the timeframe indicated, or outside the AP's retransmission buffer, that STA may declare that particular packet lost.

In other embodiments of the foregoing signal flows 500, 600, and 700, APs 502, 602, 702 may further implement certain optimizations with the MC NAK methods disclosed herein. Referring back to FIG. 1 for a moment, in an embodiment, if a STA 106 receives multiple NAK requests, but fails to receive the associated DL MC frames, the STA 106 may respond with a MC NAK indicating non-receipt of those multiple DL MC frames as indicated in the NAK request from AP 104.

Further options for embodiments of the MC NAK procedure may include a scheduled uplink (UL) MC NAK transmission. In the event multiple STAs 106a, 106b do not receive a given DL MC frame, the AP 104 may provide a designated timeframe in which particular STAs 106a and 106b transmit MC NAKs via UL 110a, 110b. This may serve to reduce the contention of MC NAKs from the various devices. Further the AP 104 may notify the MC group 103 by allocating times for MC NAK transmissions within an MC NAK request frame. As a non-limiting example, each STA 106 that is required to transmit a NAK may be assigned a time slot identified in the NAK request based on a MAC address plus a random time seed. In another embodiment, the STAs 106 may autonomously select a MC NAK transmission time.

Referring back to FIG. 7a, beacon 732 may provide to the MC group(s) 710 or individual STAs 704, 706, 708 designated NAK transmission times, transmission windows, and backoff times. In an embodiment, beacon 732 may further indicate to the recipient that individual STAs are to autonomously select a NAK response time.

Still another optimization available to the MC groups 103, 510, 610, 710 may be to provide for a deterministic contention window (CW) allowing the STAs 106 to contend for the MC NAK. In an embodiment, each STA 106 in the group may be pre-assigned with a given CW to be used during response times, or such information may be included in a beacon 690.

Figure 7B:
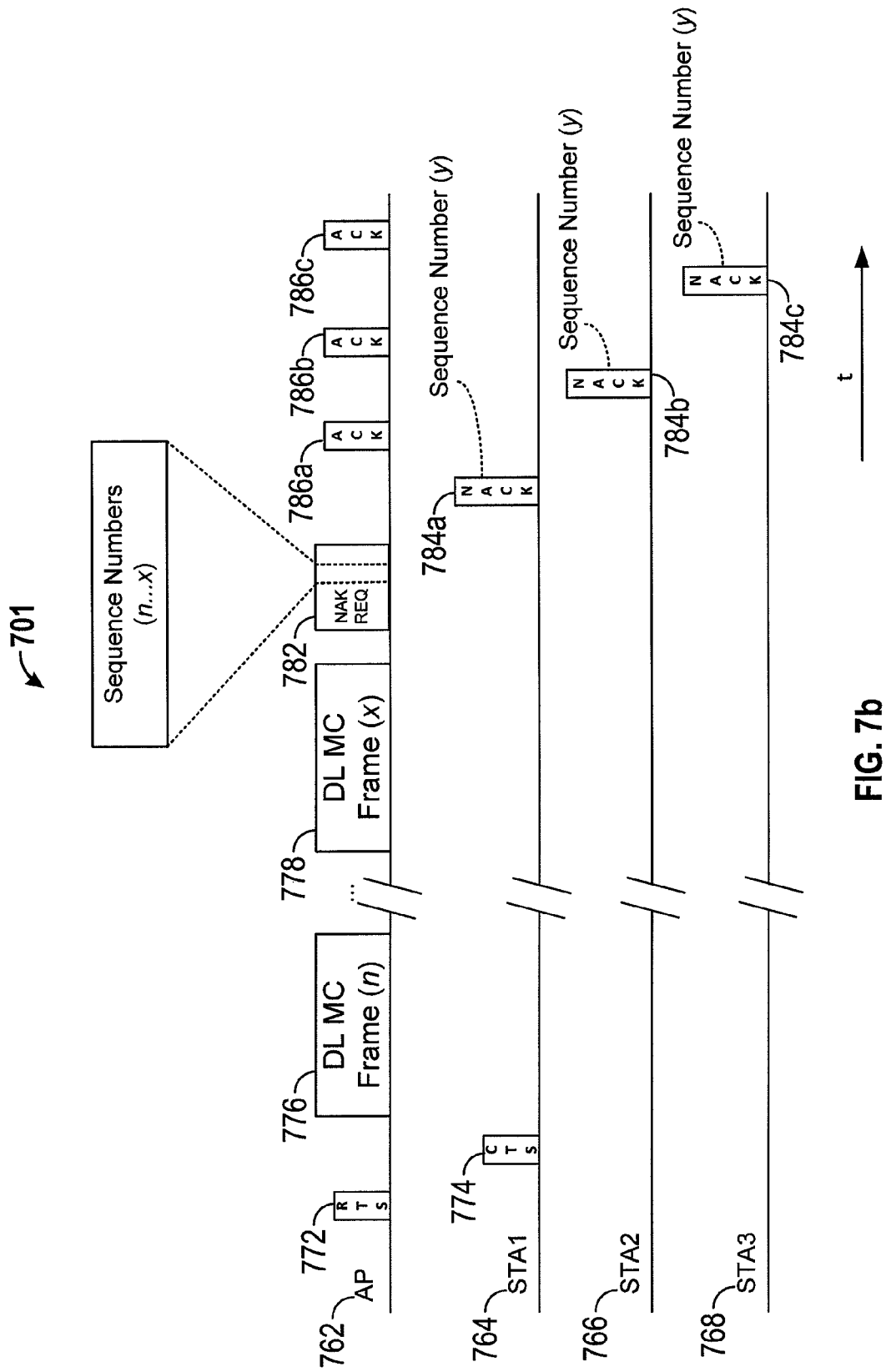
FIG. 7b illustrates an alternative view of the signal flow diagram of FIG. 7a providing partial hidden node protection.

Referring now to FIG. 7b, an alternative view of the signal flow of FIG. 7a is shown and designated signal flow 701. Signal flow 701 operates similar to signal flow 700, further showing the flexibility of NAK request 782 for the indication of failed receipt of multiple DL MC frames. The various embodiments discussed with respect to FIG. 7b may correspond to and be implemented in a similar manner as the analogous elements, structures, and processes described in FIG. 1.

AP 762 may transmit RTS 772, requesting that STA 764 respond with an indication if the medium is clear. As such, STA 764 may respond with CTS 774 if the medium is clear. AP 762 may then transmit traffic in the form of DL MC frame 776 (having sequence number "n") through DL MC frame 778 (having sequence number "x"). The breaks in the timeline and the ellipsis (" . . . ") are intended to indicate the possibility for the addition of other frames as required.

A NAK request 782 identifying the previously transmitted sequence numbers "n-x" may follow the DL MC frames 776, 778 indicating the AP 762 requires a response (e.g., a "NAK") for improper receipt of any identified frames having sequence numbers "n-x." As such, STA 764, 766, 768 may transmit a NAK 784a-c indicating non-receipt of a given frame "y," where the frame y may correspond to non-receipt of one or more of the previously transmitted frames n-x in DL MC frames 776, 778. Accordingly, each STA 764, 766, 768 may respond with a corresponding ACK 786a-c indicating receipt of the NAKs 784a-c.

Figure 7C:
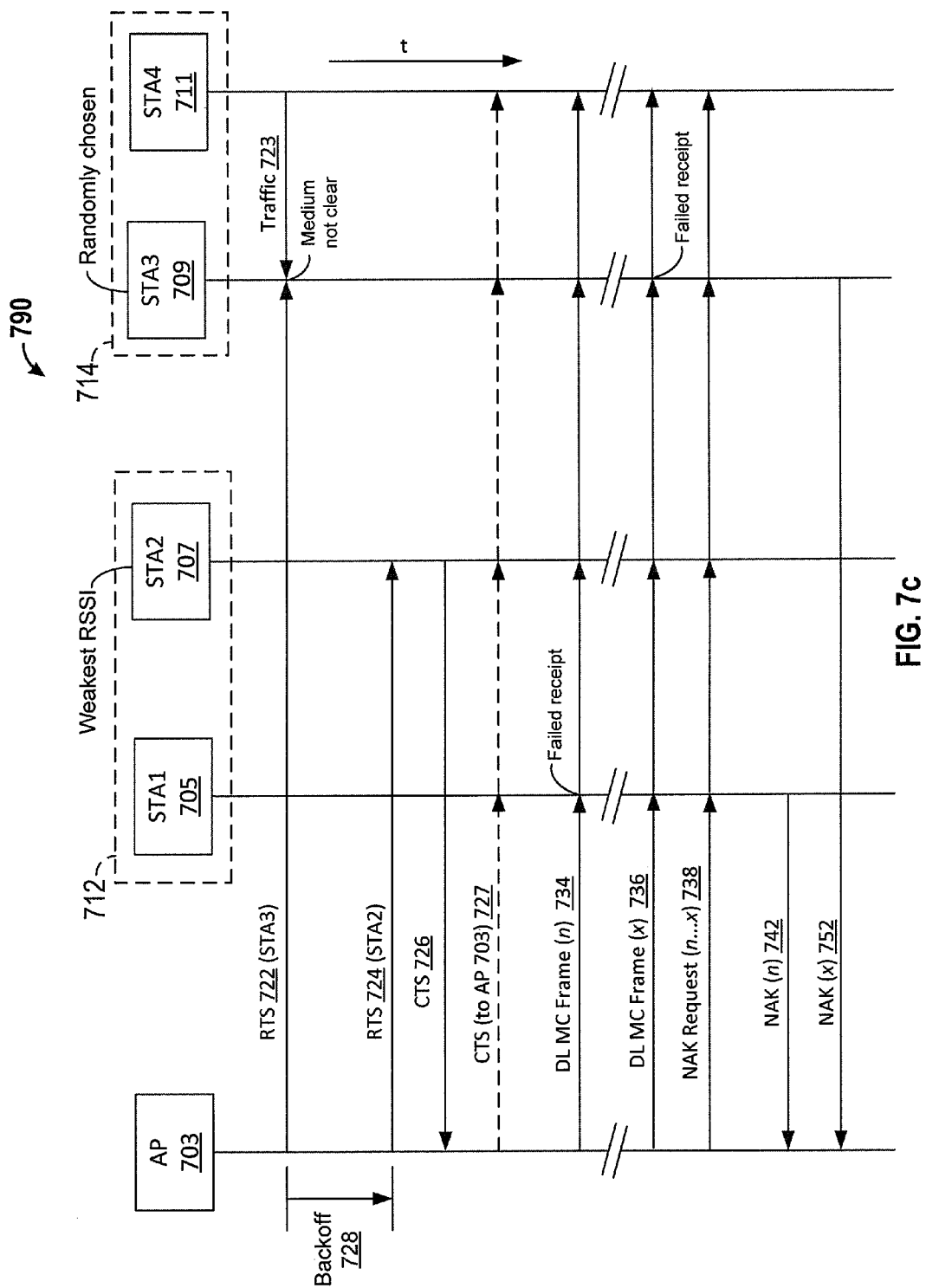
FIG. 7c illustrates another embodiment of a signal flow diagram according to the present disclosure providing partial hidden node protection.

Referring now to FIG. 7c, signal flow 790 is shown, having AP 703 and MC group 712 and MC group 714, indicating that in various embodiments DL MC frame 734 may identify multiple groups of STAs. MC group 712 comprises STA 705 and STA 707, while MC group 714 comprises STA 709 and STA 711. The various embodiments discussed with respect to FIG. 7c may correspond to and be implemented in a similar manner as the analogous elements, structures, and processes described in FIG. 1.

As briefly discussed above, in an embodiment, the AP 703 may randomly select a STA 709 from the available STAs, to which to address a RTS 722. If the medium is occupied by traffic 723 for example, then no CTS may be transmitted by STA 709. Such an embodiment is also illustrative of the disclosed avoidance techniques for the partial hidden node problem. For example, if STA 711 is not within range of AP 703 or has too weak of a signal to transmit traffic 723 back to AP 703, then the use of RTS/CTS (e.g., RTS 722) may allow detection of the occupied medium by STA 711 and prevent loss of information due to data collisions or inability of STA 709 receive the RTS 722 due to traffic 723.

In an embodiment, if the RTS 722 is not successful (e.g., no CTS is received), AP 703 may provide a backoff 728 during which it will await an appropriate CTS. The period may be an exponential backoff or deterministic backoff window predicated on the number of STAs contending for the medium.

If after the expiration of the backoff 728 no CTS is received at AP 703, another RTS 724 may be sent, this time to the STA 707 with the weakest RSSI, as shown. This may further provide increased probability of received transmissions. Advantageously, if the STA 707 with the weakest RSSI is receiving a given transmission, then the rest of the members MC groups 712, 714 should also be in receipt of the transmissions. This may serve to reduce the number of failed transmissions, increasing efficiency.

If the medium is clear, then STA 707 may respond with CTS 726 indicating the medium is free for transmission.

In an embodiment, the AP 703 may alternatively transmit a CTS 727 to itself, effectively reserving the medium for itself and ensuring a clear medium for the transmission of DL MC frame 734.

In an embodiment, DL MC frame 734 may be addressed to both MC groups 712, 714. Further, as noted in FIG. 7b, multiple DL MC frames 734, 736 (each having a sequence numbers, e.g., sequence number n and sequence number x) may be transmitted prior to a NAK request 738, the NAK request 738 indicating a requirement for acknowledging at least one of the previously transmitted DL MC frames. For example, the NAK request 738 may indicate a response is required in the event one of the frames n through x was not received by the recipient STA. As shown, STA 705 sends NAK (n) 742 indicating non-receipt of DL MC frame 734 (sequence number n) while STA 709 sends a NAK (x) 752 indicating non-receipt of DL MC frame 738 (sequence number x).

Referring now to FIG. 8a, an embodiment of a MC NAK request frame is shown and designated MC NAK request 800. MC NAK request 800 contains frame control (FC) field 802, duration/identification (duration) field 804, receiver address (RA) field 806, transmitter address (TA) field 808, MC NAK control field 810, and frame check sequence (FCS) field 812. TA field 808 may be used to indicate the transmitter address, which in some embodiments may be the MAC address of a transmitting AP. RA field 806 may comprise a MAC address of a given device or multiple devices to which the NAK request 800 is sent. RA field 806 may further be a multicast or broadcast address indicating one or more MC groups, all receivers within range, or a subset thereof as the intended receiver(s). FC field 802, duration field 804, and FCS field 812 may be similar to those fields known in the art but may include modification for adaptation (e.g., FIG. 8b) to processes disclosed herein.

MC NAK Control field 810 may comprise at least three subfields as shown: a MC flow identifier field 814, at least one MC sequence number(s) field 816, and a reserved (RSVD) field 818. Each MC data stream may be assigned a flow identifier 814, indicating the particular exchange of data within a given MC group 103. Further, the MC sequence numbers 816 may identify the last DL MC frame or frames transmitted and for which the NAK is requested, thus a device may request (e.g., via a NAK request 800) a NAK for specified frames with identified by the MC sequence number 816 (or numbers) identified. As shown, the MC sequence numbers indicated in NAK request 800 are sequence numbers "n . . . x," indicating the possible use of the NAK request 800 to request acknowledgement of one DL MC frame or a plurality of DL MC frames from the identified devices indicated in RA 806. The NAK request 800 may identify any number of DL MC frames for which an acknowledgement is requested. As shown, the MC sequence numbers 816 indicate "n-x" referring to the one or more frames for which a NAK is requested. MC NAK sequence numbers field 816 may further comprise a series of numbers, a start and end sequence number, or a range of numbers identifying the data frames for which the NAK is requested.

Referring now to FIG. 8b, an embodiment of an MC NAK control frame extension table is shown, illustrating possible bit values within an embodiment of the frame control field 802 of FIG. 8a, wherein the individual "b" indicate the location of the bits, e.g., "b2" is bit two, etc. As shown in the table, an embodiment of the FC field 802 may have two bits to describe the type value 820, four bits to describe the subtype value 822, four bits to describe the control frame extension value 824, and further include MC NAK as the subtype description 826. In an embodiment, the value of the bits and codes assigned defined the type of frame, in accordance with a given technical standard, e.g., for an IEEE 802.11 standard. As a non-limiting example, the four bits (1011) shown within control frame extension value 824 may be selected, e.g., from among those reserved within the 802.11ad standard. Such a selection may result in requiring a specific additional label for the subtype description 826, "MC-NAK."

Figures 8C, 8D:
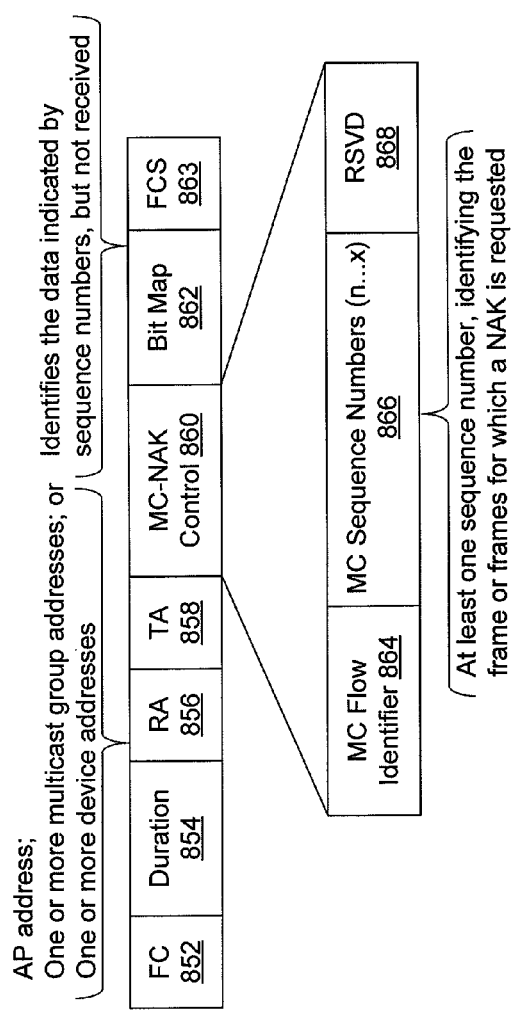
FIG. 8c is a schematic representation of an embodiment of a multicast negative acknowledgement frame, according to the present disclosure.
FIG. 8d illustrates an embodiment of a control frame extension table according to the present disclosure.

Referring now to FIG. 8c, an embodiment of a management frame for MC NAK is shown and designated MC NAK frame 850. MC NAK frame 850 illustrates a possible embodiment of an MC NAK architecture providing a manner of using the MC NAK process as discussed herein. Frame 850 may be sent in response to a NAK request 800 received from an AP and contains frame control (FC) field 852, duration/identification (duration) 854, receiver address (RA) 856, transmitter address (TA) 858, MC NAK control frame field 860, bit map 862, and frame check sequence (FCS) field 863. As before, each RA field 856 and TA field 858 may comprise a MAC address of a given a device or multiple devices. RA field 856 may further be a multicast or broadcast address indicating one or more devices or MC groups, all receivers within range, or a subset thereof as the intended receiver(s). However, in some embodiments, MC NAK frame 850 will commonly be sent according to and in response to a NAK request frame 800 from an AP. Thus, in some embodiments, RA field 856 may be addressed to only the AP sending the NAK request 800.

The MC-NAK control field 860 may include MC flow identifier field 864, MC sequence numbers (n . . . x) field 866 and a reserved (RSVD) field 868. MC flow identifier field 864 indicates the stream for which the MC NAK applies. Similar to above, the MC sequence numbers field 866 indicate the MC frame or frames for which the (NAK) bitmap 862 is sent.

Bit map 862 may include a bit map of all of the frames for which a NAK is being requested. As shown, the sequence numbers field 866 are shown as "n . . . x," corresponding to those sequence numbers identified in the NAK request 800 (MC sequence numbers 816). Accordingly, the bitmap 862 may correspond to the unreceived portions of data or the frames indicated in the MC sequence numbers field 866. In an embodiment, the values of the bitmap 862 may have a one to one correlation with the number of sequence numbers indicated in sequence number field 866. In an embodiment, the values of bitmap 862 may indicate only those sequence numbers that were not received.

In an embodiment, the sequence number of the first bit in the bit map 862 may be greater than or equal to the MC sequence number field 816 contained within the MC NAK request frame 800. As a non-limiting example such a value may be the multicast frame sequence number, for which the NAK is requested, plus one. Each successively higher bit location in the bitmap 862 corresponds to a successively higher order sequence number. The FC field 852, duration field 854, and FCS field 852 may be similar to those fields known in the art but may include modification for adaptation to processes disclosed herein.

Referring now to FIG. 8d, an embodiment of the MC NAK control frame extension table is shown, illustrating possible bit values within a possible MC NAK control frame 860 is shown, illustrating a possible description of the frame control field 852 of FIG. 8c, wherein the individual "b" indicate the location of the bits, e.g., "b2" is bit two, etc. As shown in the table, an embodiment of the FC 852 may have two bits to describe the type value 870, four bits to describe the subtype value 872, four bits to describe the control frame extension value 874, and further include MC NAK as the subtype description 876. In an embodiment, the value of the bits and codes assigned defined the type of frame, in accordance with a given technical standard, e.g., IEEE 802.11ah. As a non-limiting example, the four bits (1100) shown within control frame extension value 874 may be selected, e.g., from among those reserved within the 802.11ad standard. Such a selection may result in requiring a specific label for the subtype description 826, "MC-NAK."

Figure 9A:
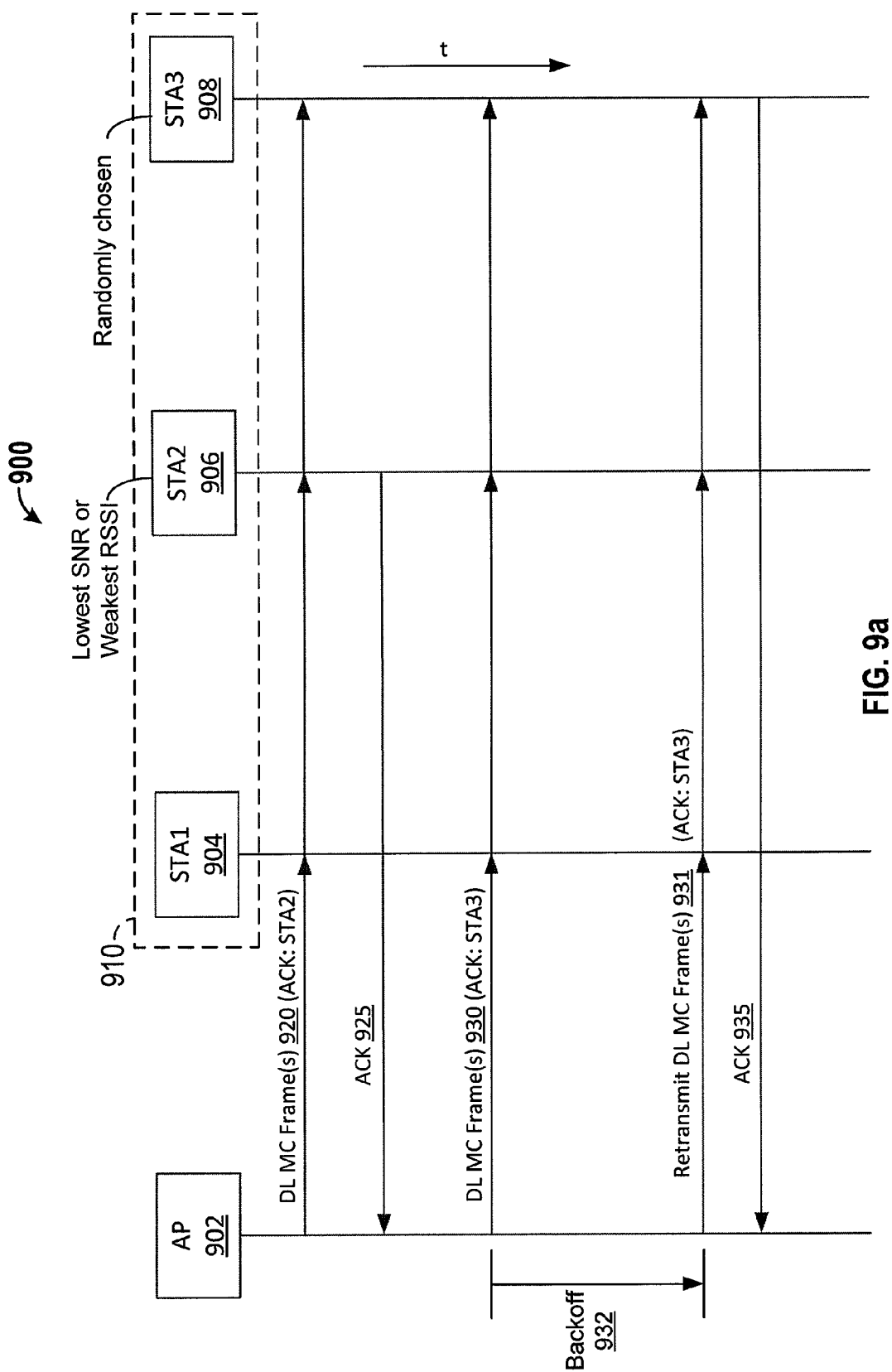
FIG. 9a illustrates an embodiment of a signal flow diagram providing an acknowledgement for downlink multicast frames according to the present disclosure.

Referring now to FIG. 9a, an embodiment of a signal flow diagram, designated signal flow 900, of a transmitter/receiver combination in a multicast (MC) communications environment incorporating multicast acknowledgment (MC-ACK) request, is shown. In the embodiment shown, AP 902 is transmitting data and receiving responses from three exemplary STAs 904, 906, 908 that comprise an embodiment of multicast group 910. It is to be appreciated by those skilled in the art, as above, that the number or composition of the multicast group 910 is not to be considered limiting. In signal flow 900, time (t) flows from top to bottom, with each vertical line indicating a terminus for data transmissions to and from each wireless device shown. Individual arrowheads indicate an intended receiver of each transmission. The various embodiments discussed with respect to FIG. 9a may correspond to and be implemented in a similar manner as the analogous elements, processes, and structures described in FIG. 1.

Signal flow 900 provides additional reliability over previously discussed signal flow embodiments. As opposed to the use of the NAK request FIG. 5a through FIG. 7b, signal flow 900 provides an ACK request by identifying a particular STA to response to the request. An AP 902 may transmit the MC DL frame 920, including an additional information element, header, or address identifying and notifying a particular STA of a required ACK response, should the transmission and receipt be successful. As shown, DL MC frame 920 identifies STA 906 ("ACK: STA2") as the STA from which a response is required ("responder STA"). Thus, following a successful receipt of the DL MC frame 920, STA 906 may respond with an appropriate ACK 925. The AP 902 may identify a single STA 906 as the designated responder STA based on a particular parameter such as the STA having the lowest data rate, weakest RSSI, lowest signal to noise ratio (SNR) or other pertinent characteristic. As shown, STA 906 was chosen as the responder STA as it has the weakest RSSI of the STAs in the MC group 910. In an embodiment, selection of the responder STA (STA 906) may alternatively be predicated on the lowest SNR. The AP 902 may further rotate the responder STA responsibilities between the various STAs within the MC group 910 for every transmission or as required.

In an embodiment, the AP 902 may also randomly select a different STA for every DL MC frame, thus rotating the responder STA responsibilities. As shown in this figure, a second MC DL frame 930 is transmitted to the MC group 910, designating STA 908 ("ACK: STA3") as the responder STA randomly selected from the MC group 910. If transmission is unsuccessful to any of the selected STAs, the AP 902 may wait a period of time, such as a backoff 932, for the appropriate ACK from the designated STA 908. In an embodiment, the AP 902 may employ an exponential backoff 932 for subsequent retransmissions. If, at the end of that backoff 932, the AP 902 has not received the proper ACK from STA 908, the AP 902 may retransmit DL MC frame 931. STA 908 then may respond with an ACK 935 upon successful receipt of the frame 931. The retransmission may have the same MCS as the DL MC frame 930, however in an embodiment, the MCS may be adjusted to ensure more reliable transmission.

Figure 9B:
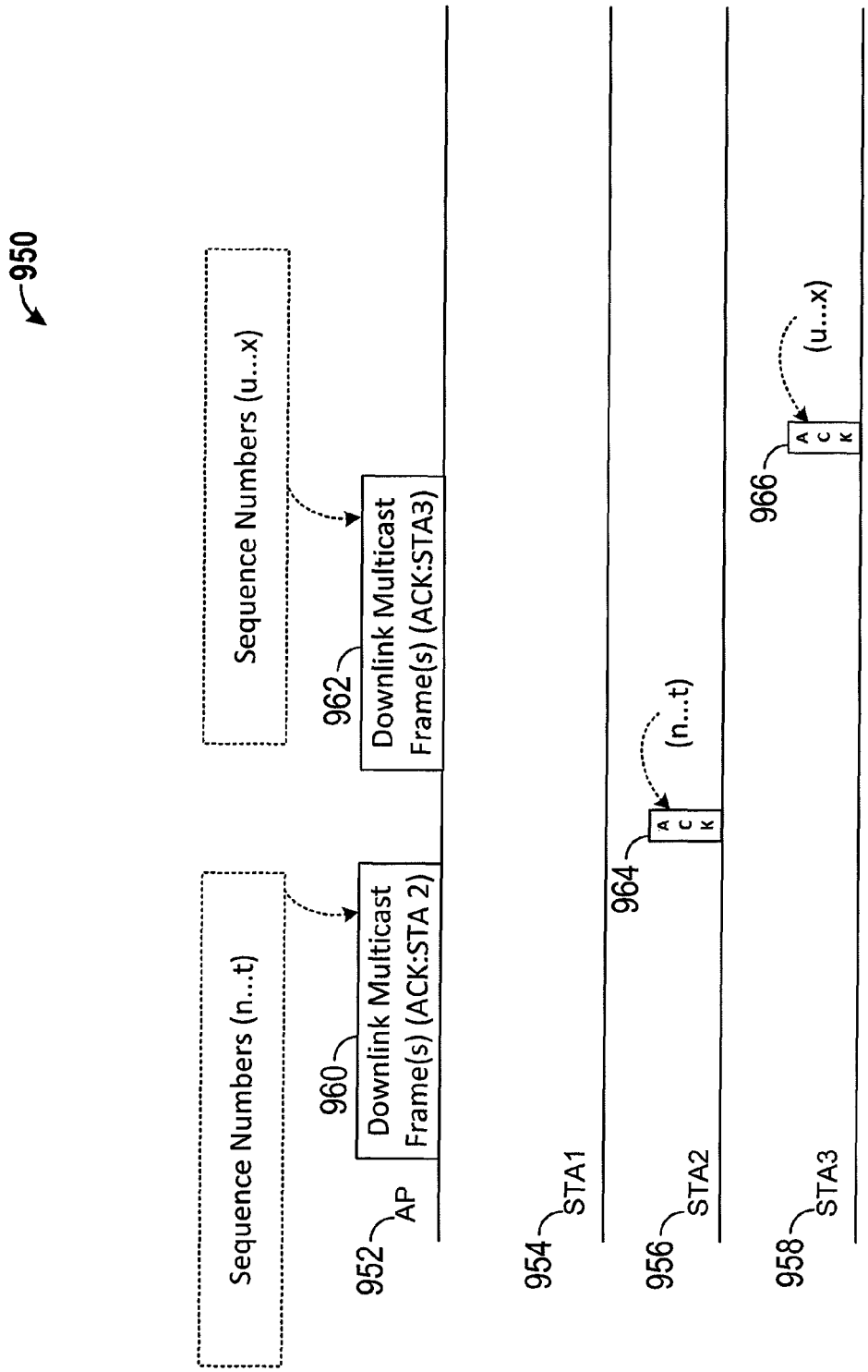
FIG. 9b illustrates an alternative view of the signal flow diagram of FIG. 9a providing an acknowledgement for downlink multicast frames according to the present disclosure.

Referring now to FIG. 9b, an alternative view of signal flow 900 is shown and designated signal flow 950. The various embodiments and elements discussed with respect to FIG. 9b may correspond to and be implemented in a similar manner as the analogous elements, processes, and structures described in FIG. 1.

Signal flow 950 shows an AP 952 transmitting traffic to STA 954, STA 956, and STA 958. Similar to above, a rotating ACK addressing process may be implemented, wherein the identity of the STA selected to indicate proper receipt of the identified DL MC frame, may change.

For example, AP 952 transmits DL MC frame 960, identifying STA 956 as the responder STA from which the ACK is requested. Upon successful receipt of the frame or frames contained in the DL MC frame(s) 960 the STA 956 may respond with an appropriate ACK 964 indicating the receipt of the frames "n . . . t" as shown. As the identity of the responder STA changes, the AP 952 may send the next DL MC frame 962 indicating that STA 958 is the responder STA. Accordingly if STA 958 successfully receives the DL MC frame(s) 962, the ACK 966 sent to AP 952 will indicate the appropriate received sequence numbers "u . . . x" as shown.

Figure 10:
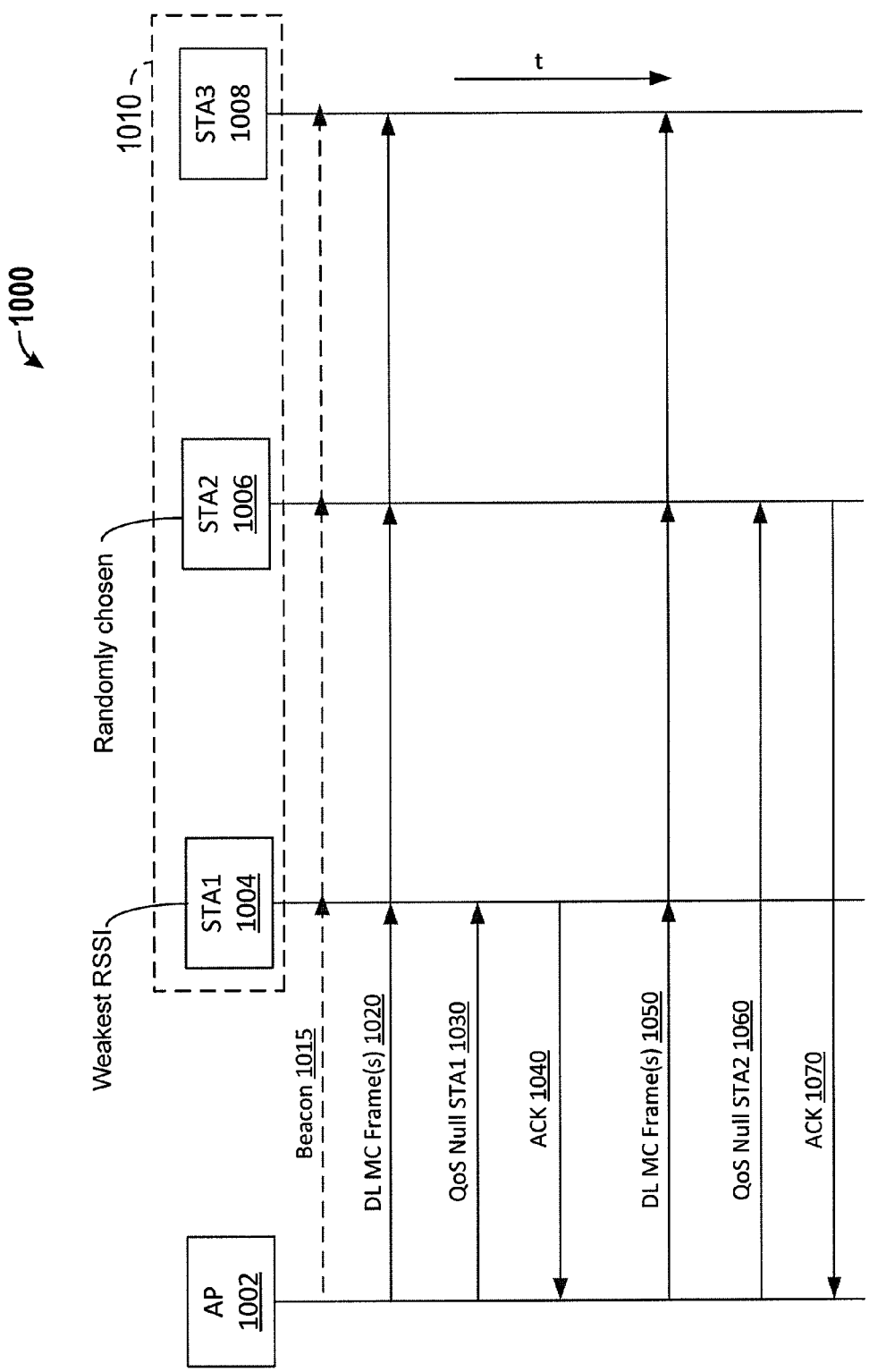
FIG. 10 illustrates an embodiment of a signal flow diagram having a quality of service null frame addressing according to the present disclosure.

Referring now to FIG. 10, an embodiment of a signal flow diagram, designated signal flow 1000, of a transmitter/receiver combination in a multicast (MC) communications environment incorporating multicast MC ACK request, is shown. As with previous figures, the various embodiments discussed with respect to FIG. 10 may correspond to and be implemented in a similar manner as the analogous elements, processes, and structures described in FIG. 1.

In the embodiment shown in FIG. 10, AP 1002 is transmitting data and receiving responses from three exemplary STAs 1004, 1006, 1008 that comprise an embodiment of multicast group 1010. In signal flow 1000, time (t) flows from top to bottom, with each vertical line indicating a terminus for data transmissions to and from each wireless device shown. Individual arrowheads indicate an intended receiver of each transmission.

As in previous embodiments, an ACK request may be directed at a single receiving STA, either designated by the AP 1002, or rotated among the members of a given MC group, such as MC group 1010. In an embodiment, such a designation, rotation, or timing system may be transmitted to each of the members of the MC group(s) 1010 via a beacon 1015. Beacon 1015 is shown in dashed lines indicating a variable position in the series of signals shown. In an embodiment, beacon 1015 may be transmitted at an interval or commanded by the AP 1002.

Similar to previous examples, a single STA within MC group 1010 may be designated as the responder STA, however in some embodiments such as signal flow 1000, a separate frame may be directed to the desired responder STA, as explained below.

In an embodiment, AP 1002 may transmit a DL MC frame 1020 to the MC group 1010. Such a DL MC frame 1020 may include MAC Protocol Data Units (MPDU) or aggregated MPDUs (A-MPDU) to decrease overhead. In an embodiment, following the DL MC frame 1020, the STA 1002 may further transmit a QoS null frame 1030, directed to STA 1004. The QoS (Quality Of Service) NULL frame may be used to flag or inform the STA 1004 that an ACK response is required. In an embodiment, the QoS null 1030 may be implemented in certain architectures in order to "address" a specific or desired responder STA without creating or requiring implementation of a separate address field that might otherwise require a hardware or software change.

QoS null frames may commonly be sent by STAs to an AP as a power management tool, however in an embodiment, the QoS null 1030 may be sent by the AP 1002 following, or alternatively, at the end of the DL MC frame 1020. If the QoS null frame 1030 is sent at the end of the DL MC frame 1020, when STA 1004, as the designated responder STA for DL MC frame 1020, receives the QoS null 1030, it will be apparent that all of the data has been received and STA 1004 may respond appropriately with an ACK 1040, indicating successful receipt of the DL MC frame 1020.

In an embodiment, the role of the responder STA may be rotated as before. AP 1002 may then transmit DL MC frame 1050 with a QoS Null frame 1060 directed to STA 1006, informing STA 1006 of the requirement to acknowledge the transmission with ACK 1070. In an embodiment, the role of the responder STA may be randomly assigned or changed in a predetermined manner. Similar to above, the STA 1004 or STA 1006 may also be selected by the AP 1002 based on a random assignment (e.g., STA 1006) or by a measurement of the weakest RSSI (e.g., STA 1004). As noted above, this selection may be transmitted in a beacon 1015.

The process implemented in signal flow 1000 may serve to reduce overhead utilizing A-MPDUs while simplifying implementation and using already-existing data frame structure(s) as the QoS Null frames 1030, 1060 may be implemented without any changes to the frame structure or data transfer protocols.

Figure 11:
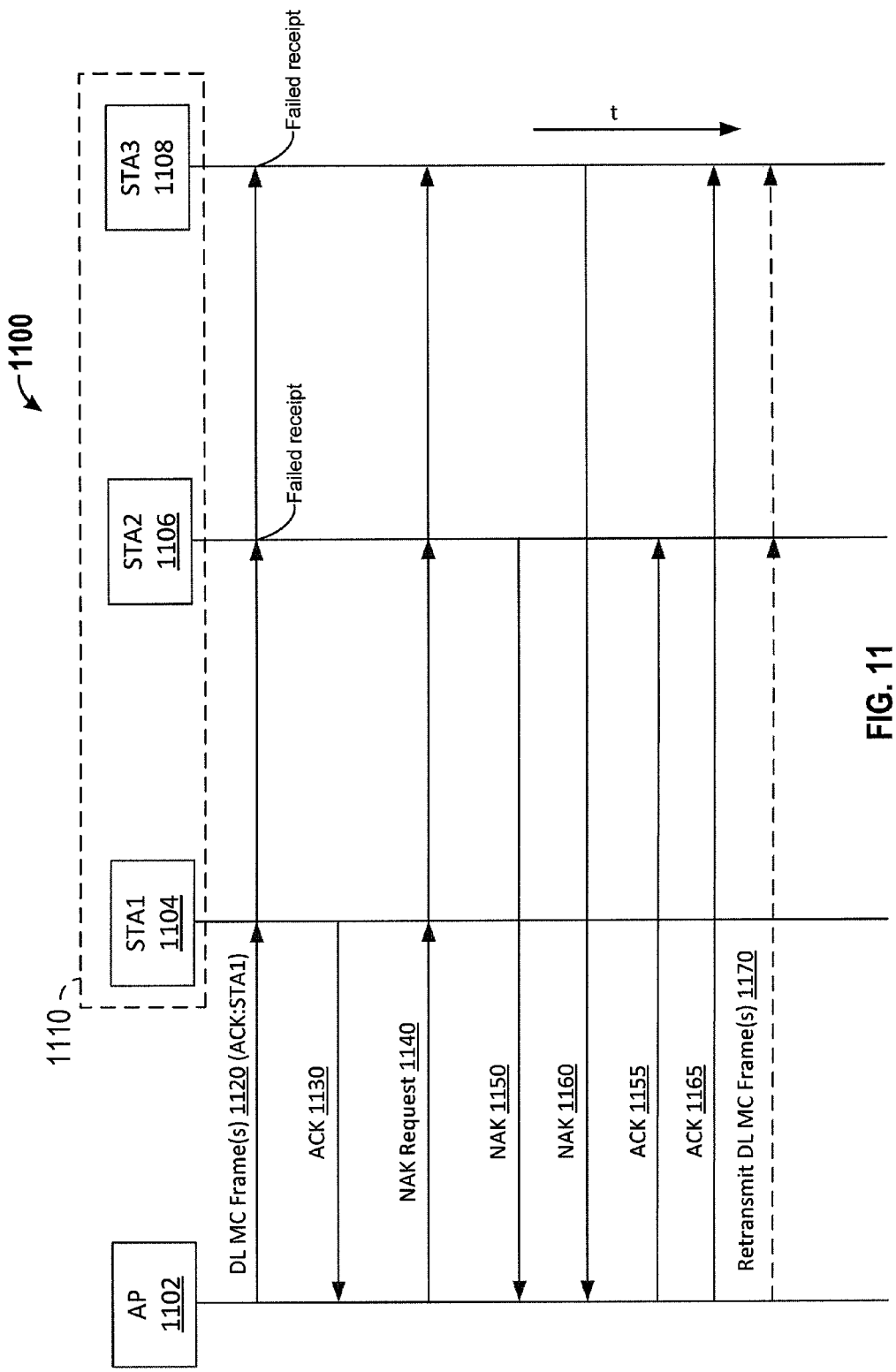
FIG. 11 illustrates an embodiment of a signal flow diagram according to the present disclosure providing a hybrid acknowledgment method.

Referring now to FIG. 11, an embodiment of a signal flow diagram, designated signal flow 1100, of a transmitter/receiver combination in a multicast (MC) communications environment incorporating multicast acknowledgment (MC-ACK) request, is shown. In the embodiment shown, AP 1102 is transmitting data and receiving responses from three exemplary STAs 1104, 1106, 1108 that comprise multicast group 1110. In signal flow 1100, time (t) flows from top to bottom, with each vertical line indicating a terminus for data transmissions to and from each wireless device shown. Individual arrowheads indicate an intended receiver of each transmission. As previously disclosed figures, embodiments discussed with respect to FIG. 11 may correspond to and be implemented in a similar manner as the analogous elements, processes, and structures described in FIG. 1.

Signal flow 1100 provides an additional ACK process providing further reliability to multicast wireless transmissions through the use of MC ACK in combination with MC NAK requests. Signal flow 1100 depicts an embodiment that may implement a MC NAK with an ACK request identifying a particular STA to response to the ACK request. An AP 1102 may transmit a DL MC frame 1120, including an addressing element within the frame identifying and notifying a particular STA (responder STA) of a required ACK response, should the transmission be successful.

As shown, DL MC frame 1120 identifies STA 1104 (e.g., "ACK: STA1"). Thus, following a successful receipt of the DL MC frame 1120, STA 1104 may respond with an appropriate ACK 1130. The AP 1102 may identify a single STA 1104 as the designated "responder STA" based on a particular parameter such as the weakest received signal strength ("RSSI"), a signal to noise ratio, a random or predetermined assignment, or other applicable characteristic known in the art. The AP 1102 may further sequentially rotate the responder STA responsibilities between the various STAs within the MC group 1010 from one DL MC frame 1120 to the next.

In an embodiment of signal flow 1100, the AP 1102 may further transmit a NAK request 1140. The STAs that did not receive the MC DL frame 1120 identified in the NAK request 1140, will be required to respond to the NAK request 1140 if they did not receive the identified DL MC frame 1120, transmitting NAK 1150 from STA 1106 and NAK 1160 from STA 1108. While the ACK 1130 received from STA 1104 may indicate to the AP 1102 that transmission of the DL MC frame 1120 to at least a portion of the MC group 1110 (STA 1104) was successful, the NAK 1140, 1150 may further indicate traffic on the medium or the presence of data collisions in the downlink transmission from the AP 1102.

In an embodiment, the AP 1102 may further acknowledge successful receipt of the NAK frames 1150, 1160 with ACK 1155 to STA 1106 and ACK 1165 to STA 1108. The combined use of the ACK request (to STA 1104) within DL MC frame 1120, with the NAK request 1140, and the ACKs 1155, 1165 may serve to maximize the reliability of wireless transmissions in the multicast environment and increase transmission efficiency, while reducing the number of ACK's or NAK's that might otherwise be present without specific addressing. As with previously disclosed figures, embodiments discussed with respect to FIG. 12 may correspond to and be implemented in a similar manner as the analogous elements, processes, and structures described in FIG. 1.

Figure 12:
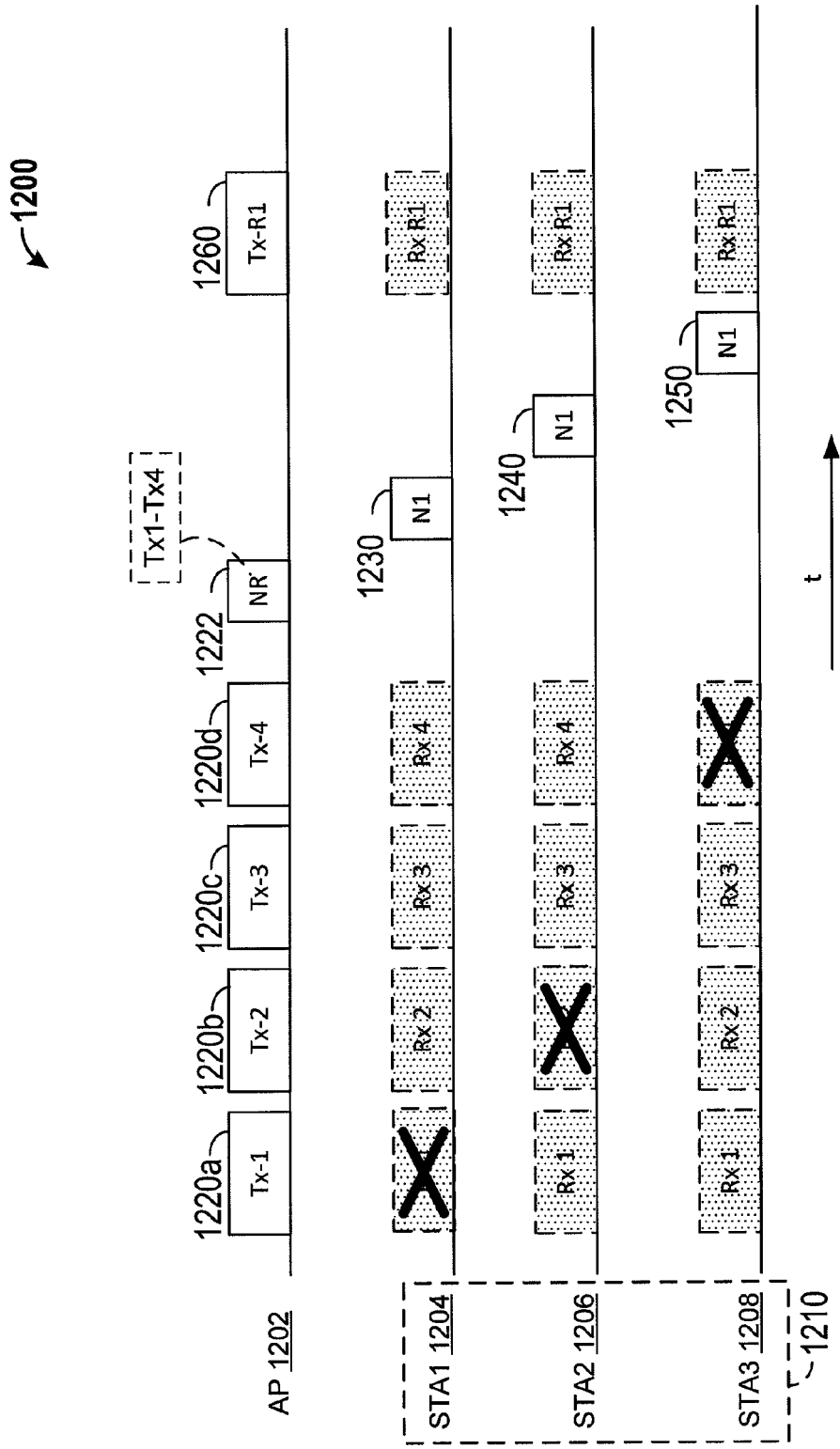
FIG. 12 illustrates an embodiment of a signal flow diagram incorporating Fountain Codes according to the present disclosure.

Referring now to FIG. 12, an embodiment of a signal flow diagram is shown and designated signal flow 1200. In signal flow 1200, AP 1202 is transmitting DL MC data to three STAs 1204, 1206, 1208, comprising a MC group 1210. As before, it should be appreciated by those skilled in the art that any practical number of STAs may be included in a given MC group 1210. Time (t) flows from left to right, with each block "Tx-X" indicating a transmission from the AP 1202, or reception ("Rx") by a STA 1204, 1206, 1208. The remaining blocks, indicate NAK requests ("NR") and NAKs (N).

In the embodiment of signal flow 1200 shown, fountain codes may be employed in the communications between AP 1202 and the MC group 1210. Fountain codes, or rateless erasure codes, may be employed in the embodiments disclosed herein to decrease the number of multicast transmissions and MC NAK/ACK Reponses. Fountain codes are characterized by the property that a transmitter/receiver pair may recover the original source symbols from any subset of the encoding symbols of a size equal to or only slightly larger than the number of source symbols received. By way of non-limiting example, if a transmission contains four frames as shown (e.g., Tx-1-Tx-4), and a receiver (e.g., a STA) receives only three of the transmitted frames, using the fountain codes, the receiver may only need to receive one additional frame to recover the data missing from the incomplete frame. For purposes of FIG. 12, the "Tx" denotes a transmitted frame, the "Rx" denotes a frame received by a given STA, and the "X" indicates a missing, or unreceived frame.

According to this example, AP 1202 may transmit data in the four frames, 1220a-d, also shown as Tx-1-Tx-4, followed by a MC NAK request (NR) 1222, similar to the methods disclosed above. NR 1222 may indicate NAKs are requested for the specific sequence numbers Tx1-Tx4. As the AP 1202 incorporates fountain codes in this embodiment, the APs 1204, 1206, 1208 may experience greater flexibility and efficiency in transmission.

In an embodiment, AP 1202 misses or otherwise does not receive frame 1220a, as noted by the "X," and as such responds with a NAK 1224. Similarly, STA 1206 fails to receive frame Tx-2 1220b, and responds with NAK 1240, while STA 1208 fails to receive frame Tx-4 1220d, and responds with NAK 1250. Without the use of fountain codes, the AP 1202, upon receipt of the three NAKs 1230, 1240, 1250 the AP 1202 may have to retransmit each of the individual missed frames 1220a, 1220b, and 1220d that were missed. However, with the use of the fountain codes, the AP 1202, upon receiving one or all the NAKs 1230, 1240, 1250, may respond with another transmission Tx-R1 1260. Because each of the STAs 1202, 1206, 1208 only missed a single frame, only the next Tx-R1 will be required for the STAs to complete the missing data contained in the missed frames 1220a, 1220b, 1220c. In an embodiment, Tx-R1 1260 need not be a retransmission of previously unreceived frames 1220a-d, but a later frame in the same transmission, allowing the receiving STAs 1202, 1204, 1206 to recover the missing data. Such an embodiment may provide a manner to reduce the number of overall retransmissions, as the AP 1202 need only transmit the next frame (Tx-R1 1260) once to the MC group 1210 in order to satisfy the three missing frames 1220a, 1220b, 1220c.

Figure 13:
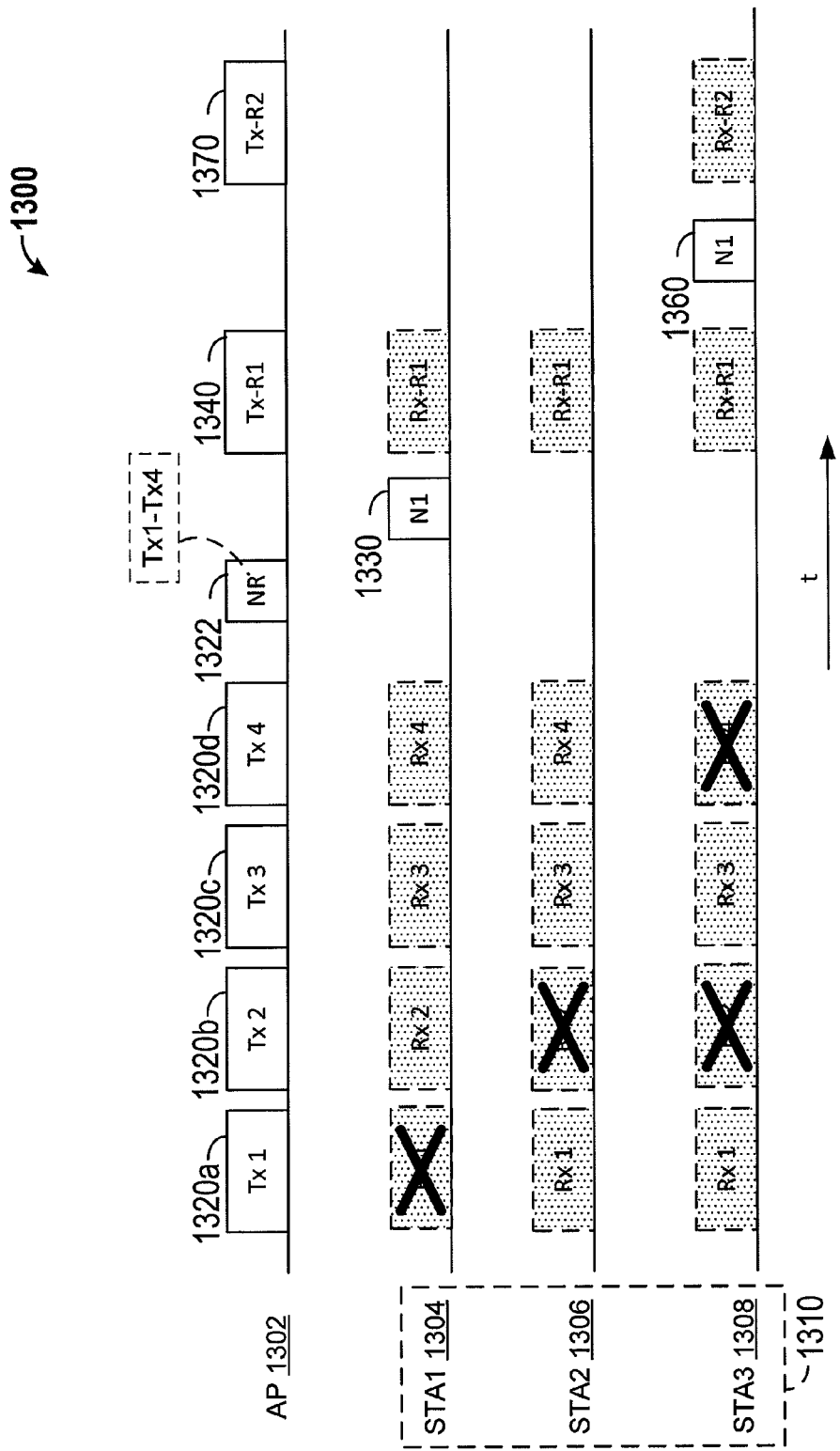
FIG. 13 illustrates another embodiment of a signal flow diagram incorporating Fountain Codes according to the present disclosure.

Referring to FIG. 13, an embodiment of a signal flow, designated signal flow 1300, utilizing fountain codes is shown reducing the overall number of NAKs required in the course of DL MC wireless communications. Signal flow 1300 shows AP 1302 sending a transmission to three STAs 1304, 1306, 1308 that comprise MC group 1310. Timing (t) flows from left to right, however the timing is not reproduced to scale. Similar to above, embodiments discussed with respect to FIG. 13 may correspond to and be implemented in a similar manner as the analogous elements, processes, and structures described in FIG. 1.

The transmission(s) from STA 1302 includes four frames Tx-1-Tx-4, labeled 1320a-d, respectively, followed by a MC NAK request 1322 referencing the previous transmission of frames 1320a-d (and indicating sequence numbers Tx1-Tx4) to the receiving MC group 1310. As shown, STA 1304 fails to receive frame 1320a (indicated by an "X") and immediately transmits a NAK 1330, indicating to the AP 1302 that frame 1320a was not received. In response, AP 1302 transmits a following frame in the fountain code: frame (Tx-R1) 1340. Because fountain codes are used, this additional frame Tx-R1 1340 may complete the transmission for STA 1304, alleviating the need for AP 1302 to retransmit the missed frame 1320a. A further benefit of the fountain code is exemplified where even though STA 1306 also fails to receive the second frame 1320b (indicated by an "X"), because the NAK 1330 was already sent, and Tx-R1 was received by STA 1206, no NAK from STA 1306 for frame 1220b is required; Tx-R1 1340 satisfies the information gap resulting from STA's 1306 unreceived frame 1320b, thereby completing the transmitted data.

In an embodiment, STA 1308 further fails to receive two frames 1320b, 1320d, but similar to above, receives frame 1340 following the NAK 1330. However, even though frame 1340 may satisfy the gap in the transmission received by STA 1306, STA 1308 still requires an additional frame to complete the transmission of Tx1-Tx4 (frames 1320a-d). As such, STA 1308 transmits a NAK 1360 due to the failed receipt of frames 1320b, 1320d. The AP 1302 may respond to the NAK 1360 with another frame Tx-R2 1370 in the transmission, using a fountain code, and allowing STA 1308 to fill the two information gaps in the transmission.

As shown, the non-limiting example illustrated by the embodiment of signal flow 1300 can be seen to reduce the overall number of retransmissions and NAKs from previous embodiments. As shown, without the use of fountain codes, four total NAKs would be required for the four missed frames (indicated by the X's), whereas only NAKs 1330, 1360 are required in this embodiment. Further, four retransmissions of the missed data may be required in an embodiment not employing fountain codes; as shown only two are required.

Figure 14A:
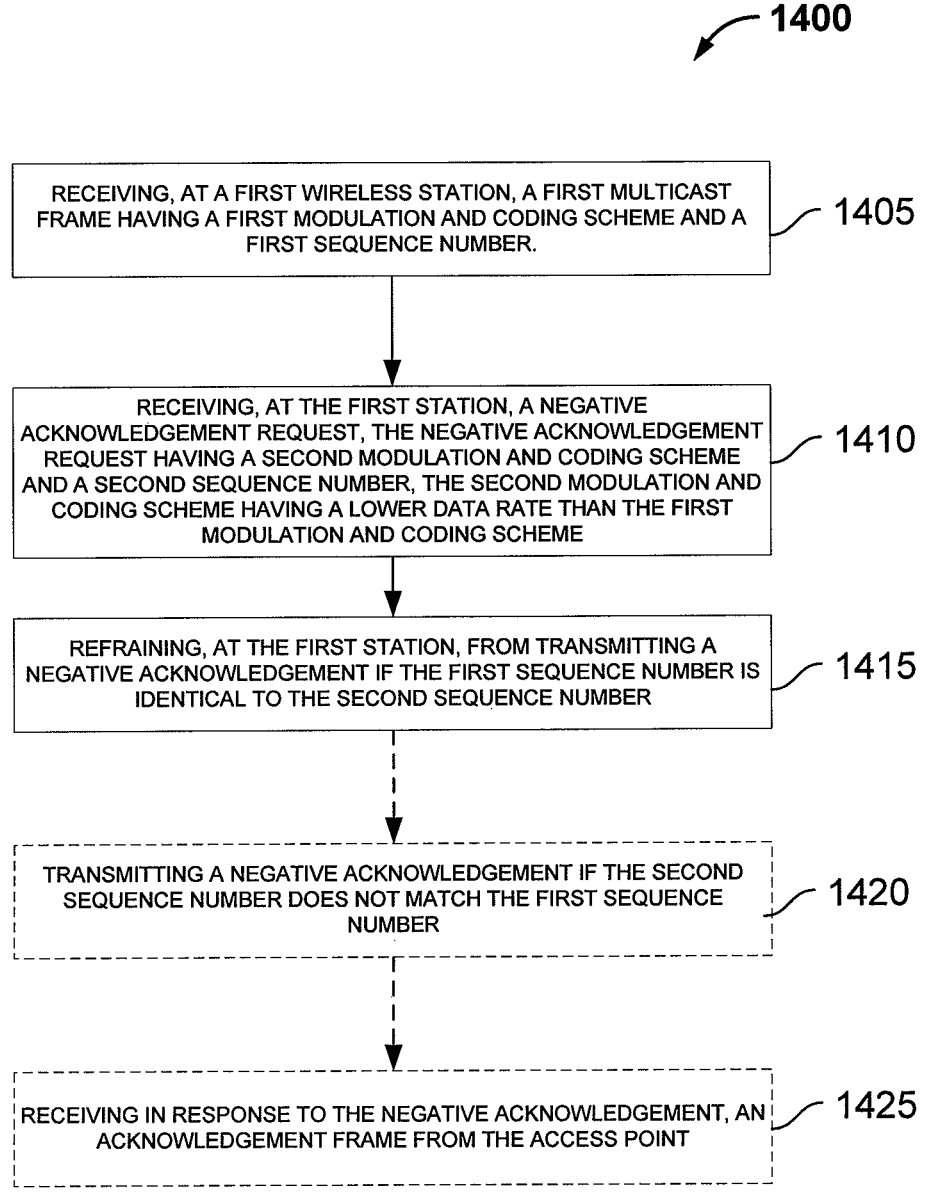
FIG. 14a is a flowchart illustrating an embodiment of the process according to the present disclosure.

Referring now to FIG. 14a, an illustrative flowchart is shown, depicting an embodiment of processes 1400 disclosed herein. Process 1400 begins at block 1405; a first station may receive a first multicast frame having a first modulation and coding scheme and a first sequence number. Then, at block 1410, the first station may receive a negative acknowledgement request, the negative acknowledgement request having a second modulation and coding scheme and a second sequence number, the second modulation and coding scheme having a lower data rate than the first modulation and coding scheme. The lower modulation and coding scheme is intended to increase the probability that the NAK request arrives at the intended receiver station. Further the sequence number or numbers included in the NAK request may refer to a previously sent downlink multicast frame for which the NAK is requested, in the event of non-receipt of the frame at the station. At block 1415, shown in dashed lines, the first station may refrain from a negative acknowledgement request, the negative acknowledgement request having, or otherwise being encoded with a second modulation and coding scheme and a second sequence number, the second modulation and coding scheme having a lower data rate than the first modulation and coding scheme.

Blocks 1420 and 1425 are shown in dashed lines, indicating optional steps in the disclosed process. In the event a given DL MC frame is successfully received at the station (NAK not required) then the process will end for that particular DL MC frame. At block 1420, the first station may transmit a negative acknowledgement if the second sequence number does not match the first sequence number, where a given DL MC frame is not received. At block 1425, the station may receive, in response to the negative acknowledgement, an acknowledgement frame from the access point, indicating successful receipt of the NAK frame at the access point.

Figure 14B:
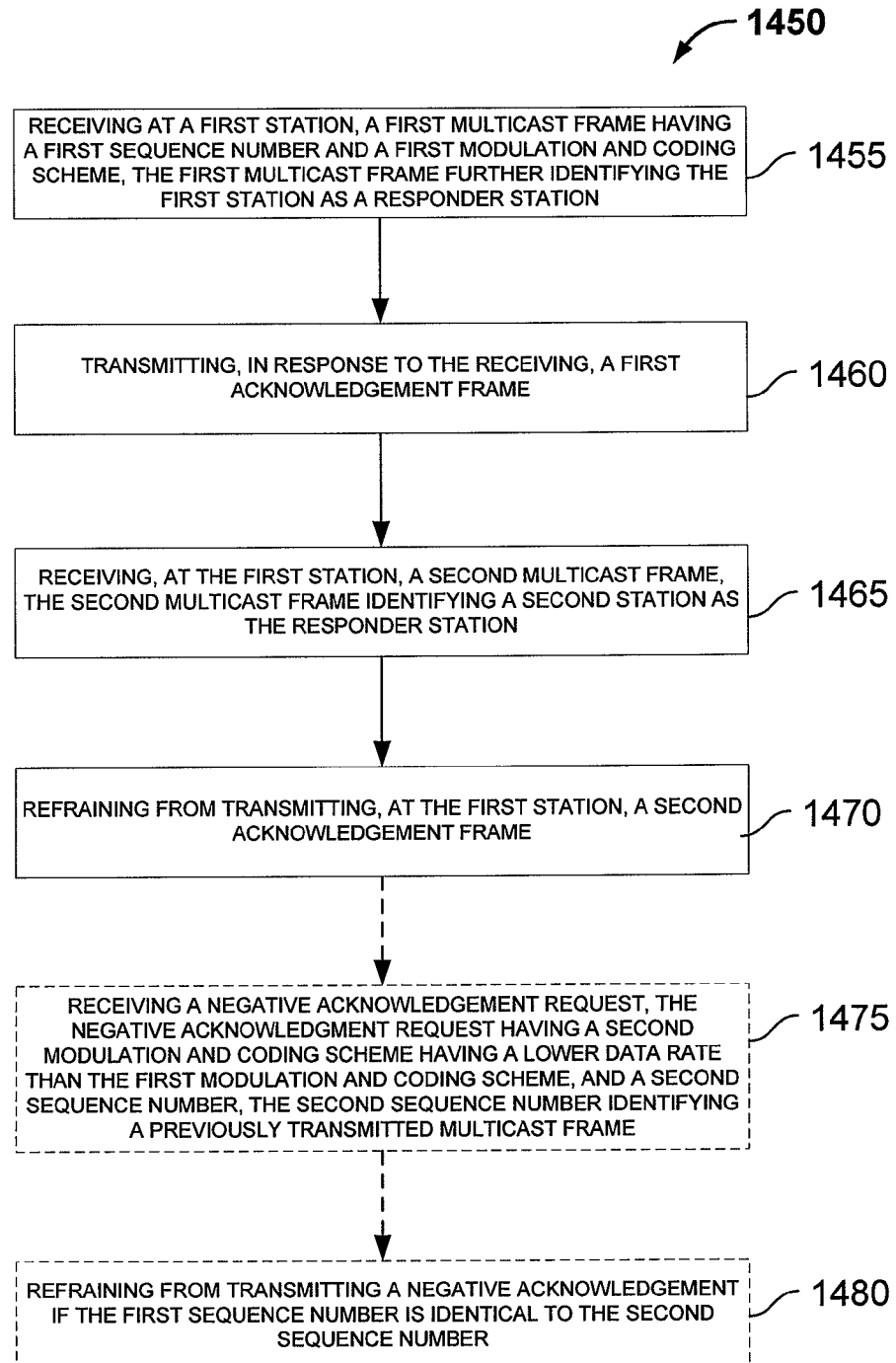
FIG. 14b is a flowchart illustrating an embodiment of the process according to the present disclosure.

Referring now to FIG. 14b, an illustrative flowchart is shown, depicting an embodiment of processes 1450 disclosed herein. At block 1455, a first station may receive a first multicast frame having a first sequence number and a first modulation and coding scheme, the first multicast frame further identifying the first station as a responder station. In response to receiving the transmission identifying the first station as a responder station, the first station may transmit, on behalf of the multicast group at block 1460, a first acknowledgement frame, indicating receipt of the first multicast frame. At 1465, the first station may further receive a second multicast frame identifying a second station as the responder station, however since the first station is not identified as the responder station, at block 1470, the first station refrains from transmitting an acknowledgement frame, even if the first station received the second multicast frame.

Blocks 1475 and 1480 are shown in dashed lines indicating an optional process the multicast group may employ, transmitting an additional negative acknowledgement request frame. At block 1475, the first station may further receive a negative acknowledgement request, the negative acknowledgement request having a second modulation and coding scheme lower (e.g., a more "robust" MCS) than the first modulation and coding scheme, and a second sequence number, the second sequence number identifying a previously transmitted multicast frame. The "more robust" MCS may be intended to increase or ensure proper receipt of the negative acknowledgement request, even if the identified multicast frame was not received. In the event that the multicast frame was received at the station, at block 1480, the station will refrain from transmitting a negative acknowledgement if the first sequence number is identical to the second sequence number. Refraining from transmitting the NAK indicates proper receipt of the multicast frame identified in the NAK request.

Figure 15:
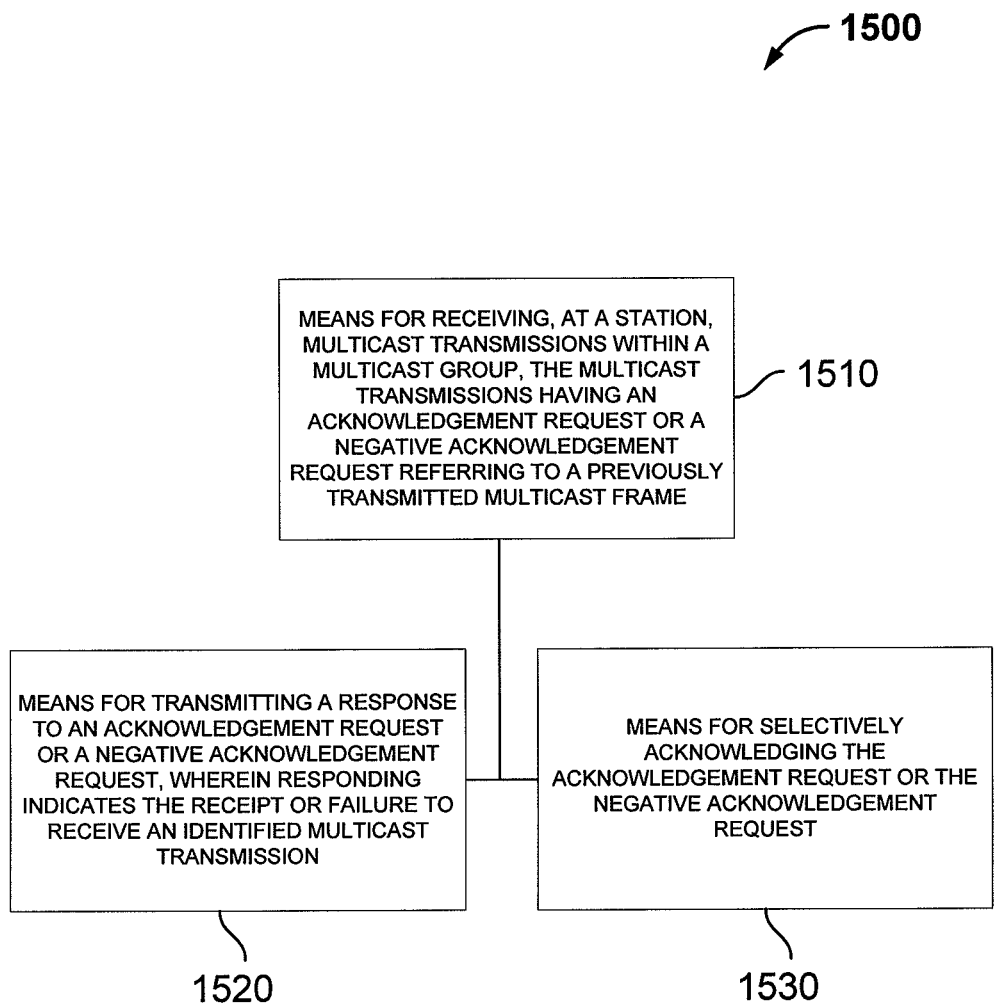
FIG. 15 is a functional block diagram of an embodiment according to the present disclosure.

Referring now to FIG. 15, a functional block diagram of an embodiment 1500 according to the present invention, methods, and processes as disclosed above. Means for receiving 1510, receives, at a station, multicast transmissions within a multicast group, the multicast transmissions having an acknowledgement request or a negative acknowledgement request referring to a previously transmitted multicast frame. The means for receiving 1510 interacts with means for transmitting 1520 that may transmit a response to an acknowledgement request or a negative acknowledgement request, wherein responding indicates the receipt or failure to receive (as discussed above) an identified multicast transmission. The means for receiving 1510 and the means for transmitting 1520 both also interact with means for refraining 1530, that may prevent a station within a multicast group from transmitting a response to the acknowledgement request or the negative acknowledgement request, as required by the multicast frame, acknowledgement request, or negative acknowledgement request.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
receiving, at a first station, a first multicast frame having a first modulation and coding scheme and a first sequence number;
receiving, at the first station, a negative acknowledgement request, the negative acknowledgment request having a second modulation and coding scheme and a second sequence number, the second modulation and coding scheme having a lower data rate than the first modulation and coding scheme; and
selectively acknowledging the negative acknowledgment request based on whether the second sequence number matches the first sequence number.

2. The method of claim 1 further comprising:
transmitting a negative acknowledgement if the second sequence number does not match the first sequence number; and
receiving, in response to the negative acknowledgement, an acknowledgement frame from an access point.

3. The method of claim 1 further comprising:
receiving, from the access point, a request to send message, the request to send message identifying the first station; and
transmitting, in response to the receiving and a clear channel assessment, a clear to send message.

4. The method of claim 1 further comprising:
receiving, at the first station, the first multicast frame and a first message, the first message identifying the first station as a responder station, the responder station being one of a plurality of stations of a multicast group;
transmitting, in response to the receiving and the first message, a first acknowledgement frame;
receiving, at the first station, a second multicast frame and a second message, the second message identifying the responder station; and
selectively transmitting a second acknowledgement frame, based on the second message.

5. The method of claim 4, the first message and the second message each comprising a quality of service null frame indicating the identity of the responder station.

6. The method of claim 1, further comprising;
receiving, at the first station, the negative acknowledgement request identifying a plurality of sequence numbers, the plurality of sequence numbers identifying a plurality of multicast frames;
selectively acknowledging the negative acknowledgment, based on the plurality of sequence numbers.

7. The method of claim 1, the wireless communications further comprising fountain codes for communications within the multicast group, the multicast group including at least the first station and the second station.

8. The method of claim 1, wherein at least the first station and the second station are members of the multicast group.

9. An apparatus for wireless communications, comprising:
a receiver configured to:
receive a first multicast frame having a first modulation and coding scheme and a first sequence number; and
receive a negative acknowledgement request, the negative acknowledgment request having a second modulation and coding scheme and a second sequence number, the second modulation and coding scheme having a lower data rate than the first modulation and coding scheme;
a processor configured to compare the second sequence number to the first sequence number; and
a transmitter configured to transmit a negative acknowledgment based on the comparison.

10. The apparatus of claim 9, the receiver further configured to receive, in response to the negative acknowledgement, an acknowledgement frame from an access point.

11. The apparatus of claim 9, further comprising:
the receiver further configured to receive, from the access point, a request to send message, the request to send message identifying a responder station, the responder station being one of a plurality of stations of a multicast group;
the processor further configured to:
compare an identity of the apparatus with the identity of the responder station; and
conduct a clear channel assessment based on the comparison; and
the transmitter further configured to transmit, based on the receiving and the clear channel assessment, a clear to send message.

12. The apparatus of claim 9, further comprising:
the receiver further configured to receive the first multicast frame and a message, the message identifying the responder station;
the processor further configured to compare the identity of the apparatus to the identity of the responder station identified in the message;
the transmitter further configured to transmit, based on the comparison, an acknowledgement frame.

13. The apparatus of claim 12, the message further comprising a quality of service null frame indicating the identity of the responder station.

14. The apparatus of claim 9, the wireless communications further comprising fountain codes for communications within a multicast group including at least the first station.

15. The apparatus of claim 9, wherein at least the first station and the second station are members of the multicast group.

16. An apparatus for wireless communications, comprising:
means for receiving a first multicast frame having a first modulation and coding scheme and a first sequence number;
means for receiving a negative acknowledgement request, the negative acknowledgment request having a second modulation and coding scheme and a second sequence number, the second modulation and coding scheme having a lower data rate than the first modulation and coding scheme; and
means for selectively acknowledging the negative acknowledgment request if the second sequence number does not match the first sequence number.

17. The apparatus of claim 16, further comprising
means for transmitting a negative acknowledgement if the second sequence number does not match the first sequence number; and
means for receiving, in response to the negative acknowledgement, an acknowledgement frame from an access point.

18. The apparatus of claim 16 further comprising:
means for receiving, from the access point, a request to send message, the request to send message identifying the first station; and
means for transmitting, in response to the receiving and a clear channel assessment, a clear to send message.

19. The apparatus of claim 16 further comprising:
means for receiving, at a first station, the first multicast frame and a first message, the first message identifying the first station as a responder station;
means for transmitting, in response to the first message, a first acknowledgement frame;
means for receiving, at the first station, the second multicast frame and a second message, the second message identifying the second station as the responder station; and
means for selectively transmitting a second acknowledgement frame, based on the second message.

20. The apparatus of claim 19, the first message and the second message each comprising a quality of service null frame indicating the identity of the responder station.

* * * * *